US012269742B2

(12) United States Patent
Noda et al.

(10) Patent No.: US 12,269,742 B2
(45) Date of Patent: Apr. 8, 2025

(54) MANUFACTURING APPARATUS AND MANUFACTURING METHOD FOR CARBON NANOTUBE

(71) Applicants: WASEDA UNIVERSITY, Tokyo (JP); MEIJO NANO CARBON CO., LTD., Aichi (JP)

(72) Inventors: Suguru Noda, Tokyo (JP); Katsuya Namiki, Tokyo (JP); Zihao Zhang, Tokyo (JP); Toshio Osawa, Tokyo (JP); Hisashi Sugime, Tokyo (JP)

(73) Assignees: WASEDA UNIVERSITY, Tokyo (JP); MEIJO NANO CARBON CO., LTD., Aichi (JP)

( * ) Notice: Subject to any disclaimer, the term of this patent is extended or adjusted under 35 U.S.C. 154(b) by 0 days.

(21) Appl. No.: 18/678,425

(22) Filed: May 30, 2024

(65) Prior Publication Data

US 2024/0308852 A1 Sep. 19, 2024

Related U.S. Application Data

(63) Continuation of application No. 17/632,730, filed as application No. PCT/JP2020/028754 on Jul. 27, 2020, now abandoned.

(30) Foreign Application Priority Data

Aug. 9, 2019 (JP) ................................ 2019-147941

(51) Int. Cl.
*C01B 32/162* (2017.01)
*B01J 4/00* (2006.01)
(Continued)

(52) U.S. Cl.
CPC ............ *C01B 32/162* (2017.08); *B01J 4/002* (2013.01); *B01J 4/008* (2013.01); *B01J 6/008* (2013.01);
(Continued)

(58) Field of Classification Search
CPC . C01B 32/162; C01B 32/159; C01B 2202/30; C01B 2202/36; C01B 32/182;
(Continued)

(56) References Cited

U.S. PATENT DOCUMENTS

2004/0223901 A1 11/2004 Smalley
2007/0148962 A1 6/2007 Kauppinen
(Continued)

FOREIGN PATENT DOCUMENTS

| | | |
|---|---|---|
| CN | 109607513 | 4/2019 |
| JP | 6455988 | 1/2019 |
| KR | 20050108699 | 11/2005 |

OTHER PUBLICATIONS

Katsuya, et al., Continusous Synthesis of Single-Walled Carbon Nanotubes and Fibrous Aggregate Thereof by Floating Catalyst Chemical Vapor Deposition, SCEJ 82nd Annual Meeting, Toyko 2017, pp. 1-3 (Year: 2017).*
(Continued)

*Primary Examiner* — Daniel C. McCracken
(74) *Attorney, Agent, or Firm* — DUANE MORRIS LLP; Gregory M. Lefkowitz; Brandon A. Chan

(57) ABSTRACT

Provided are a carbon nanotube production device and production method capable of realizing high-temperature heating of a catalyst raw material in a floating catalyst chemical vapor deposition (FCCVD) method, and improving the quality and yield of carbon nanotubes synthesized. A carbon nanotube production device 1 includes a synthesis furnace 2 for synthesizing carbon nanotubes; a catalyst raw material supplying nozzle 3 for supplying a catalyst raw material used to synthesize carbon nanotubes to the synthesis furnace 2; and a nozzle temperature adjusting unit 6 capable of setting a temperature of an inner portion 4 of the catalyst raw material supplying nozzle 3 higher than a temperature of a reaction field 5 of the synthesis furnace 2.
(Continued)

Catalyst raw material supplying portion
Inert gas supplying portion
Carbon raw material supplying portion By supplying to the synthesis furnace 2 the catalyst raw material that has been thermally decomposed after being heated to a temperate at which a catalyst metal will not yet be condensed, and by having the thermally decomposed catalyst raw material rapidly cooled to a CVD temperature at the synthesis furnace 2, microscopic catalyst metal particles will be generated at a high density in the space of the reaction field 5 such that carbon nanotubes having a small diameter can be vapor-grown at a high density.

20 Claims, 19 Drawing Sheets

(51) Int. Cl.
*B01J 6/00* (2006.01)
*B82Y 40/00* (2011.01)

(52) U.S. Cl.
CPC .......... *B01J 2204/002* (2013.01); *B82Y 40/00* (2013.01)

(58) Field of Classification Search
CPC ... C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B01J 4/002; B01J 4/008; B01J 6/008; B01J 2204/002; B01J 2219/00119; B01J 2219/00135; B01J 19/26; B82Y 40/00; B82Y 30/00
See application file for complete search history.

(56) References Cited

U.S. PATENT DOCUMENTS

| | | | | |
|---|---|---|---|---|
| 2008/0063589 | A1 | 3/2008 | Nakayama | |
| 2011/0168942 | A1 | 7/2011 | Hitoe | |
| 2013/0039838 | A1* | 2/2013 | Lashmore | B01J 19/088 977/750 |
| 2013/0126793 | A1 | 5/2013 | Hitoe | |
| 2016/0236937 | A1 | 8/2016 | Wang | |
| 2017/0292208 | A1 | 10/2017 | Yoon | |
| 2017/0327378 | A1 | 11/2017 | Pick | |
| 2018/0170758 | A1 | 6/2018 | Hirai | |
| 2018/0264443 | A1 | 9/2018 | Hashimoto | |

OTHER PUBLICATIONS

Chen, et al., A Review of Three Major Factors Controlling Carbon Nanotube Synthesis from the Floating Catalyst Chemical Vapor Depoistion, Nano LIFE 2019; 9(4): 19300002-1 to 19300002-19 (Year: 2019).*

Definition of "nozzle," accessed online at https://www.merriam-webster.com/dictionary/nozzle on Jan. 15, 2025 (Year: 2025).*

Katsuya, N., et al., "Continuous Synthesis of Single-Walled Carbon Nanotubes and Fibrous Aggregate Thereof by Floating Catalyst Chemical Vapor Deposition," SCEJ 82nd Annual Meeting, Tokyo 2017.

Katsuya, N., et al., "Vapor-Phase Synthesis of Single-Walled Carbon Nanotubes Using Floating Catalyst; and Analysis of Reaction Field/Flow Field," SCEJ 83rd Annual Meeting, Osaka 2018.

* cited by examiner

FIG.11A
FIG.11B
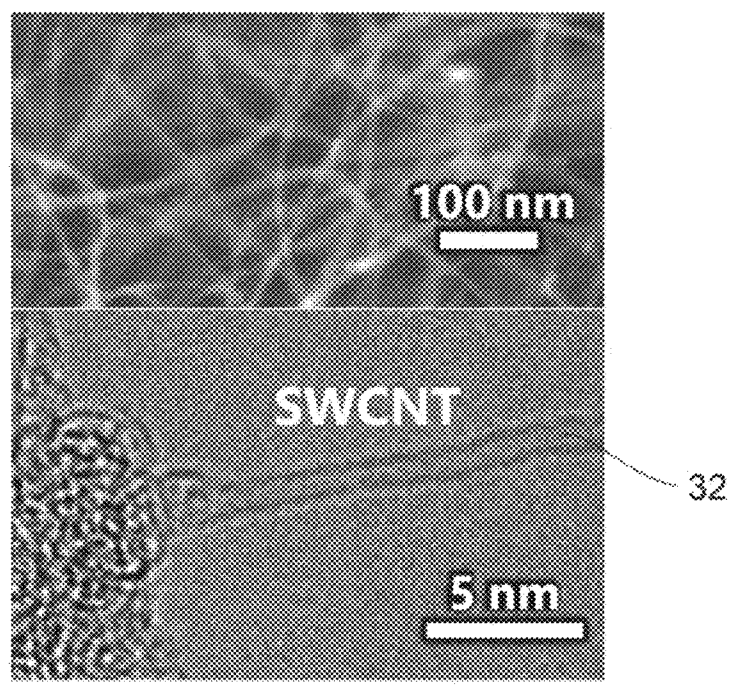
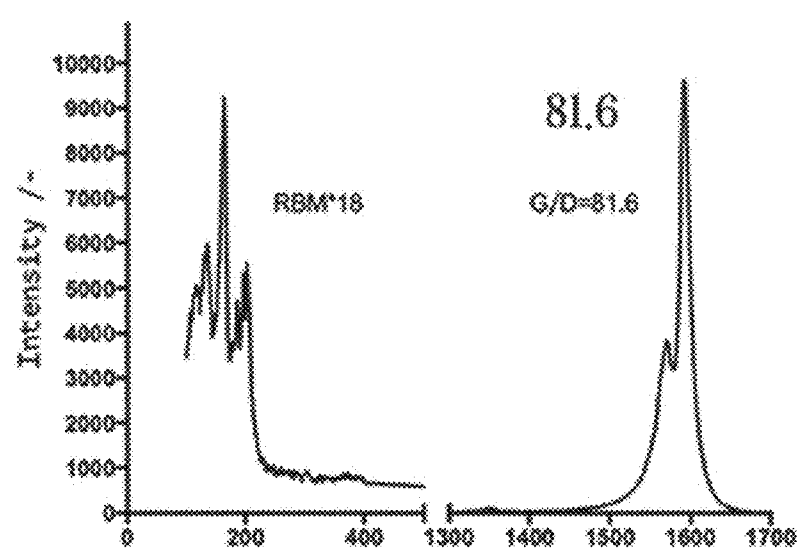
FIG.12

MANUFACTURING APPARATUS AND MANUFACTURING METHOD FOR CARBON NANOTUBE

CROSS-REFERENCE TO RELATED APPLICATIONS

This application is a continuation of U.S. patent application Ser. No. 17/632,730, filed Feb. 3, 2022, which is a § 371 national stage entry of International Application No. PCT/JP2020/028754, filed on Jul. 27, 2020, which claims priority to Japanese Patent Application No. 2019-147941, filed on Aug. 9, 2019, the entire contents of which are incorporated herein by reference.

TECHNICAL FIELD

The present invention relates to a device and method for producing carbon nanotubes.

BACKGROUND ART

Conventionally, as one of the methods for synthesizing carbon nanotubes (also referred to as CNTs hereunder), there is known a floating catalyst chemical vapor deposition (FCCVD) method where a carbon raw material gas in which catalyst metal particles are dispersed in vapor phase is to be supplied to a synthesis furnace, and CNTs are then grown from the catalyst metal particles in a floating state. The inventors of the present invention developed a carbon nanotube production method where a tungsten wire is wound around an outer circumferential portion of an alumina-made catalyst raw material suppling nozzle for supplying a catalyst raw material, and such tungsten wire is then electrically heated to preheat and rapidly raise the temperature of an organic metal compound as the catalyst raw material so as to produce carbon nanotubes. The object of this method is to generate, at a high density, catalyst metal particles with a small diameter in a space by decomposing the organic metal compound in a short period of time, and attempts were also made in this method to improve the quality of CNTs synthesized and increase the yield thereof (e.g. Non-patent document 1).

Further, the inventors of the present invention proposed a method where a catalyst metal vapor is to be generated by decomposing a catalyst raw material with a premixed flame, followed by generating catalyst metal nanoparticles by mixing the catalyst metal vapor with a carrier gas and a carbon raw material gas so as to continuously synthesizing single-walled CNTs (e.g. Patent document 1).

PRIOR ART DOCUMENTS

Non-Patent Documents

Non-patent document 1: Namiki et al. "vapor-phase synthesis of single-walled carbon nanotubes using floating catalyst; and analysis of reaction field/flow field," The Society of Chemical Engineers, Japan, lecture abstract of 83rd Annual Meeting (2018), PE383.

Patent Documents

Patent document 1: Japanese Patent No. 6455988

SUMMARY OF THE INVENTION

Problems to be Solved by the Invention

The problem with the CNT synthesis method disclosed in the non-patent document 1 is as follows. That is, since heating is performed from outside the catalyst raw material supplying nozzle with the tungsten wire, while the temperature of an inner portion of the alumina-made catalyst raw material supplying nozzle can be raised to a temperature of the same level as the temperature of a reaction field of the synthesis furnace, it is difficult to set the temperature of the inner portion higher than the temperature of the reaction field, which makes it impossible to heat the catalyst raw material flowing through the catalyst raw material supplying nozzle to a sufficiently high temperature. Further, since the alumina-made catalyst raw material supplying nozzle is to be heated to a high temperature, there is also a problem that the alumina component of the catalyst raw material supplying nozzle will mix into the CNTs synthesized.

The problem with the CNT synthesis method disclosed in the patent document 1 is that it is difficult to improve a productivity, because an excessive amount of oxygen ($O_2$), water vapor ($H_2O$) and carbon dioxide ($CO_2$) will mix into a raw material for synthesizing CNTs, and the number of the catalyst metal nanoparticles by which CNTs do not grow will thus increase.

Means to Solve the Problems

The present invention was made in view of these circumstances, and provides a carbon nanotube production device and production method capable of improving the quality and yield of CNTs synthesized by a reaction of catalyst metal particles and a carbon raw material, where a catalyst raw material is to be thermally decomposed by raising the temperature of the catalyst raw material in a catalyst raw material supplying nozzle to a high temperature, the thermally decomposed catalyst raw material is then supplied to a synthesis furnace to be rapidly cooled to a chemical vapor deposition (CVD) temperature as a CNT growth temperature band so as to generate microscopic catalyst metal particles, and an agglutination caused by the collision between these microscopic catalyst metal particles is inhibited.

The present invention provides a carbon nanotube production device including:

a synthesis furnace for synthesizing carbon nanotubes;

a catalyst raw material supplying nozzle for supplying a catalyst raw material used to synthesize the carbon nanotubes to the synthesis furnace; and a nozzle temperature adjusting unit capable of setting a temperature of an inner portion of the catalyst raw material supplying nozzle higher than a temperature of a reaction field of the synthesis furnace.

The production device may be such that the temperature of the inner portion of the catalyst raw material supplying nozzle is a temperature at which the catalyst raw material thermally decomposes to generate a catalyst metal vapor; the temperature of the reaction field of the synthesis furnace is a temperature at which catalyst metal particles are generated, and CNTs are generated.

In the production device of the present invention, the nozzle temperature adjusting unit may be provided inside the catalyst raw material supplying nozzle.

In the production device of the present invention, the nozzle temperature adjusting unit may be a heater.

In the production device of the present invention, the heater may be composed of carbon, and may be electrically heated to adjust the temperature of the inner portion of the catalyst raw material supplying nozzle.

In the production device of the present invention, there may be provided a plurality of the catalyst raw material supplying nozzles.

In the production device of the present invention, a carbon raw material flow passage for flowing a carbon raw material therethrough may be provided outside an outer circumferential portion of the catalyst raw material supplying nozzle.

The present invention provides a carbon nanotube production method wherein a catalyst raw material is heated by setting a temperature of an inner portion of a catalyst raw material supplying nozzle for supplying the catalyst raw material used to synthesize carbon nanotubes to a synthesis furnace higher than a temperature of a reaction field of the synthesis furnace for synthesizing the carbon nanotubes.

In the production method of the present invention, the temperature of the inner portion of the catalyst raw material supplying nozzle may be a temperature at which the catalyst raw material thermally decomposes to generate a catalyst metal vapor; the temperature of the reaction field of the synthesis furnace may be a temperature at which CNTs are generated.

In the production method of the present invention, the temperature of the inner portion of the catalyst raw material supplying nozzle may be adjusted by a nozzle temperature adjusting unit provided inside the catalyst raw material supplying nozzle.

Effects of the Invention

The present invention can provide a carbon nanotube production device and production method capable of improving the quality and yield of CNTs synthesized, by setting the temperature of the inner portion of the catalyst raw material supplying nozzle higher than the temperature of the reaction field of the synthesis furnace.

BRIEF DESCRIPTION OF THE DRAWINGS

FIG. 11 is a set of images including a SEM image (FIG. 11A) and TEM image (FIG. 11B) of the CNTs produced in the working example 1 of the present invention.

FIG. 12 is a diagram showing a Raman spectrum of CNTs produced in a working example 2a of the present invention.

MODE FOR CARRYING OUT THE INVENTION

Based on drawings and working examples, described hereunder is a preferable embodiment of a device and method of the present invention for producing carbon nanotubes (also referred to as CNTs hereunder).

1. Carbon Nanotube Production Device

Figure 1:
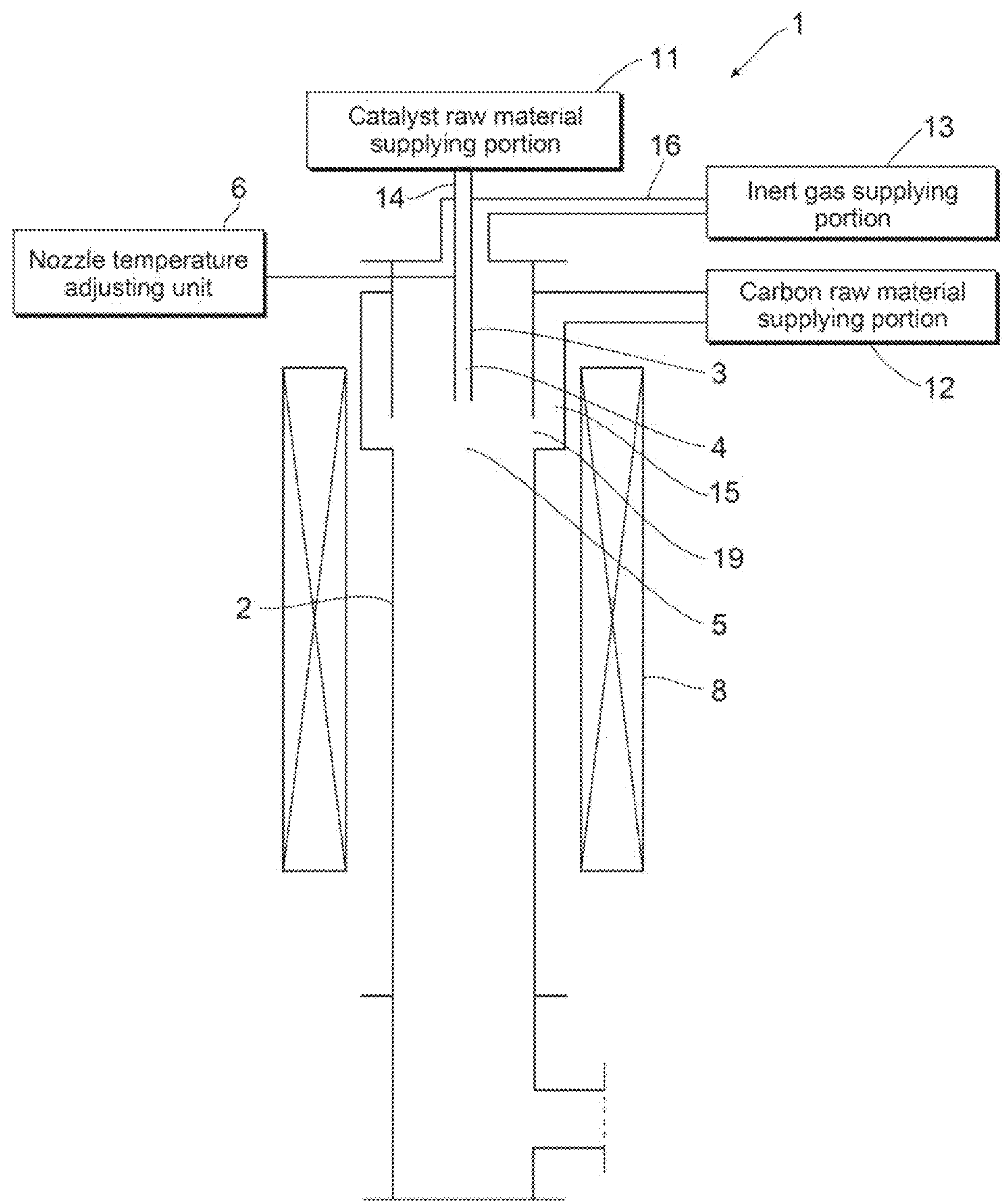
FIG. 1 is a schematic view showing a carbon nanotube production device of an embodiment of the present invention.

FIG. 1 is a schematic view showing a carbon nanotube production device 1 of the present embodiment. This production device 1 includes a synthesis furnace 2 for synthesizing carbon nanotubes; a catalyst raw material supplying nozzle 3 for supplying a catalyst raw material used to synthesize carbon nanotubes to the synthesis furnace 2; and a nozzle temperature adjusting unit 6 capable of setting a temperature of an inner portion 4 of the catalyst raw material supplying nozzle 3 higher than a temperature of a reaction field 5 of the synthesis furnace 2.

A catalyst raw material supplying portion 11 for supplying the catalyst raw material and a cocatalyst if necessary is connected to the catalyst raw material supplying nozzle 3 through a catalyst raw material supplying tube 14. A carbon raw material supplying portion 12 for supplying a carbon raw material is connected to a carbon raw material supplying tube 15. Connected to an inert gas supplying tube 16 is an inert gas supplying portion 13 for supplying, if necessary, an inert gas such as argon (Ar) used for purging.

The synthesis furnace 2 is formed of a cylindrical container made of, for example, quartz glass, ceramics or stainless steel. The reaction field 5 of the synthesis furnace 2 is a region where CNTs grow.

The catalyst raw material and cocatalyst are to be supplied from the catalyst raw material supplying portion 11 to the catalyst raw material supplying nozzle 3 through the catalyst raw material supplying tube 14, in the form of a vapor after being sublimated, and using argon (Ar) or the like as a carrier gas. Since the temperature of the inner portion 4 of the catalyst raw material supplying nozzle 3 is set in such a manner that heating therein shall take place at a temperature higher than the temperature of the reaction field 5 of the synthesis furnace 2, the catalyst raw material will be subjected to a rapid temperature rise and thermally decomposed inside the catalyst raw material supplying nozzle 3. The thermally decomposed catalyst raw material will then be rapidly cooled to a CVD temperature at the synthesis furnace 2 to form catalyst metal particles; carbon nanotubes will then be produced by having these catalyst metal particles react with the carbon raw material.

In a conventional method, as a result of supplying the catalyst metal particles to the synthesis furnace 2 at a high concentration, the catalyst metal particles will immediately agglutinate in vapor phase, which makes it impossible to obtain CNTs having a small diameter. In the embodiment of the present invention, the catalyst raw material is heated to a temperature (e.g. 1,400° C. or higher as the temperature of the inner portion 4 of the catalyst raw material supplying nozzle 3) higher than the temperature of the reaction field 5 of the synthesis furnace 2 in a short period of time (e.g. 10 msec or shorter), thereby allowing the catalyst raw material to be supplied to the synthesis furnace while decomposing the same and inhibiting the generation of the catalyst metal particles. Next, as a result of having the decomposed catalyst raw material and the carbon raw material rapidly mixed together, a catalyst metal vapor will be cooled to the CVD temperature (e.g. 1,200° C. or lower) as the temperature of the reaction field 5 of the synthesis furnace 2 such that nuclei of metal particles will be generated, and that microscopic catalyst metal particles will then be generated at a high density in the space of the reaction field 5 of the synthesis furnace 2, thus allowing CNTs with a small diameter to be vapor-grown at a high density without permitting time for the catalyst metal particles to agglutinate.

As the catalyst raw material, there can be used a material containing, as a catalyst component(s), at least one metal element selected from iron (Fe), cobalt (Co), nickel (Ni), molybdenum (Mo), yttrium (Y) and copper (Cu). Among these elements, iron (Fe) is particularly preferred; ferrocene ($Fe(C_5H_5)_2$) is particularly preferred as the catalyst raw material.

Sulfur (S) is preferred as the cocatalyst. As a sulfur source, there may be used, for example, sulfur, thiophene and hydrogen sulfide. Sulfur is expected to bring about an effect of stably forming small catalyst metal particles, and promoting carbon precipitation from the iron catalyst metal particles. However, the cocatalyst is not an essential component.

In the present embodiment, the carbon raw material is to be supplied from the carbon raw material supplying portion 12 to the synthesis furnace 2 through the carbon raw material supplying tube 15, as a carbon source gas. Examples of the carbon raw material include methane ($CH_4$), acetylene ($C_2H_2$), ethylene ($C_2H_4$), toluene ($C_6H_5CH_3$) and ethanol ($C_2H_5OH$); in the present invention, methane ($CH_4$) and ethylene ($C_2H_4$) are particularly preferred as they are capable of inhibiting the occurrence of impurities such as tar. The carbon raw material can, for example, be supplied to the synthesis furnace 2 together with a carrier gas such as argon (Ar) and hydrogen ($H_2$).

In FIG. 1, the carbon raw material flows from top down in the carbon raw material supplying tube 15 provided at an upper outer circumferential portion of the synthesis furnace 2, and is then horizontally supplied to the synthesis furnace 2 from a carbon raw material flow outlet 19 provided at a side portion of the synthesis furnace 2. There are no particular restrictions on a method for supplying the carbon raw material so long as the method allows the carbon raw material and the decomposed catalyst raw material supplied from the catalyst raw material supplying nozzle 3 to be mixed in the reaction field 5 of the synthesis furnace 2.

As a method for supplying the carbon raw material, for example, a carbon raw material flow passage 17 (see FIG. 31) for flowing the carbon raw material therethrough may be provided outside an outer circumferential portion of the catalyst raw material supplying nozzle 3. The carbon raw material is preheated utilizing the heat discharged from the nozzle temperature adjusting unit 6, and then supplied to the synthesis furnace 2 after the rise in temperature, thereby allowing the reaction field 5 to maintain a high temperature. Next, the thermally decomposed catalyst raw material and the preheated carbon raw material can be swiftly mixed together.

The CNT production device 1 may also be configured in a manner where there are provided a plurality of the catalyst raw material supplying nozzles 3. By employing a plurality of the catalyst raw material supplying nozzles 3, the CNT production device 1 can be scaled up to a large device such as those used in a plant so that productivity can be improved as a mass production facility. A specific configuration example of the CNT production device 1 having a plurality of the catalyst raw material supplying nozzles 3 is described later.

As the nozzle temperature adjusting unit 6, there may be employed, for example, a unit for heating the inner portion 4 of the catalyst raw material supplying nozzle 3 from within the catalyst raw material supplying nozzle 3. Further, there are no particular restrictions on the unit as the nozzle temperature adjusting unit 6 for heating the inner portion 4 of the catalyst raw material supplying nozzle 3 so long as the temperature of the inner portion 4 of the catalyst raw material supplying nozzle 3 can be set to a temperature that is sufficiently higher than the temperature of the reaction field 5 of the synthesis furnace 2; for example, the inner portion 4 of the catalyst raw material supplying nozzle 3 may be heated from outside the catalyst raw material supplying nozzle 3.

With regard to the nozzle temperature adjusting unit 6, as a unit for performing heating from within the catalyst raw material supplying nozzle 3, the nozzle temperature adjusting unit 6 can be provided inside the catalyst raw material supplying nozzle 3. In such case, since the catalyst raw material flowing through the catalyst raw material supplying nozzle 3 can be directly heated by the nozzle temperature adjusting unit 6, the catalyst raw material can be decomposed in a short period of time. Further, the catalyst raw material supplying nozzle 3 can be prevented from being damaged by the heat generated from the nozzle temperature adjusting unit 6.

Meanwhile, as the nozzle temperature adjusting unit 6, if employing a unit for performing heating from outside the catalyst raw material supplying nozzle 3, this unit may also be used in combination with a unit for performing heating from within the catalyst raw material supplying nozzle 3. In such case, as the unit for performing heating from within the catalyst raw material supplying nozzle 3, a ceramic heat transfer rod (see FIG. 2 and FIG. 3), for example, may be installed inside the catalyst raw material supplying nozzle 3 such that the heat transfer rod will be heated by a radiation from within the catalyst raw material supplying nozzle 3. Since the inner portion 4 of the catalyst raw material supplying nozzle 3 will be evenly heated both from within the catalyst raw material supplying nozzle 3 and by the surface of the heat transfer rod, the catalyst raw material can be thermally decomposed in a short period of time, and then by cooling such catalyst raw material to the CVD temperature at the reaction field 5 of the synthesis furnace 2, the catalyst metal particles can be generated at a high density in the space.

Figure 31:
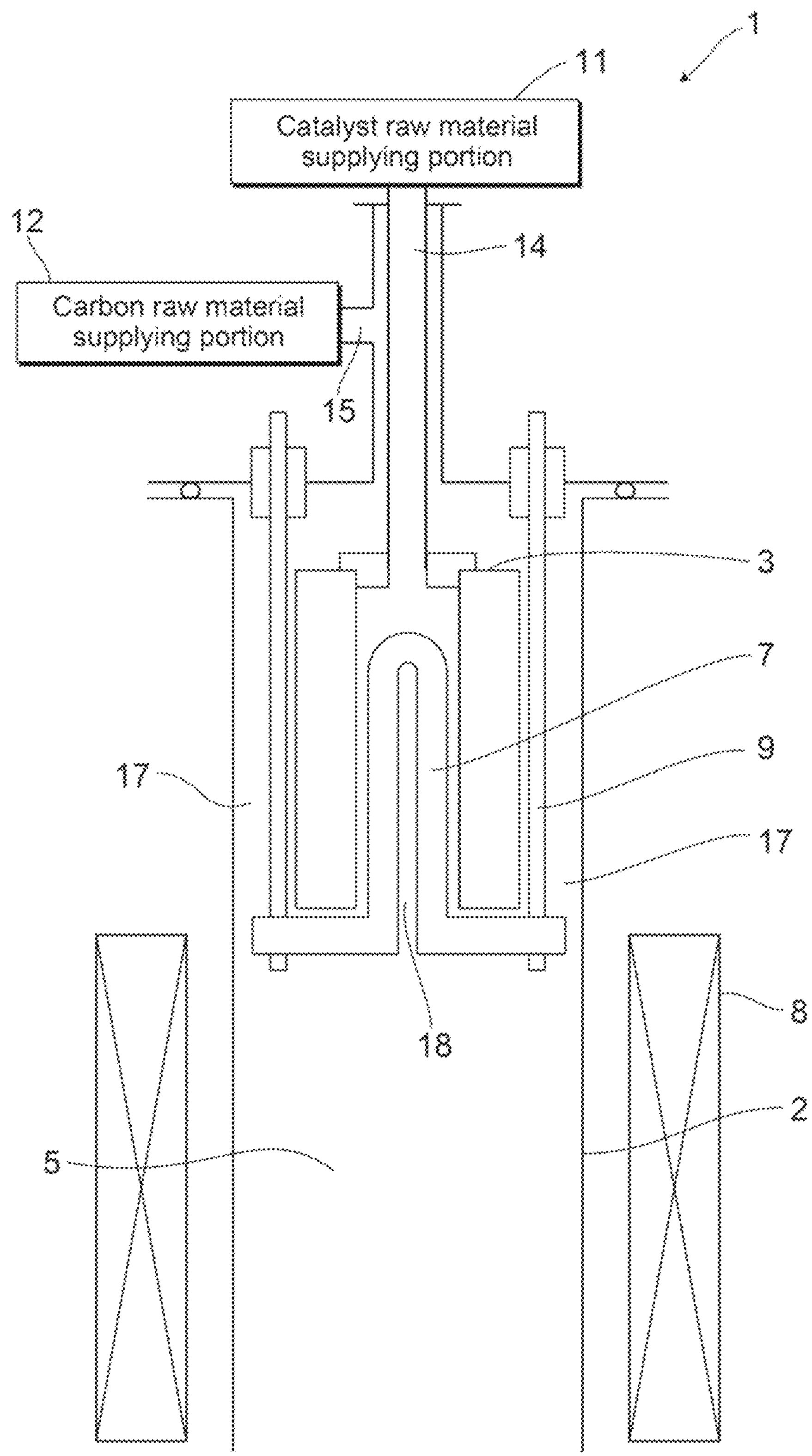
FIG. 31 is a schematic view partially showing an example of a configuration of a carbon nanotube production device of a working example 3 of the present invention.

Further, the nozzle temperature adjusting unit 6 may also be a heater 7 (see FIG. 31). Preferably, the heater 7 is composed of carbon, and is electrically heated so as to raise the temperature of the inner portion 4 of the catalyst raw material supplying nozzle 3, where the temperature of the inner portion 4 of the catalyst raw material supplying nozzle 3 is adjusted by changing the amount of electricity conducted. Since the catalyst raw material can be directly heated by the heater 7, the temperature of the catalyst raw material can be raised to a high temperature at which the catalyst metal will not yet be condensed, and while reliably inhibiting the generation of the catalyst metal particles at the nozzle inner portion 4 of the catalyst raw material supplying nozzle 3, by cooling the catalyst metal vapor to the CVD temperature at the reaction field 5 of the synthesis furnace 2, the catalyst metal particles can be generated at a high density in the space.

In the case of a metallic heater, there is a problem that the heater will carbonize or embrittle due to the carbons in a catalyst raw material such as ferrocene ($Fe(C_5H_5)_2$). The problems with a ceramic heater are that it is of high resistance; and that the resistance value of the heater will change as carbons precipitate on the surface, which makes it difficult to control the temperature of the heater. A carbon heater will not embrittle due to carbons even when performing electrical heating, and a change in the resistance value thereof due to carbon precipitation is small as well.

It is preferred that a heat retention unit 8 for controlling the temperature of the reaction field 5 of the synthesis furnace 2 be provided, for example, outside an outer circumferential portion of the synthesis furnace 2. The heat retention unit 8 may, for example, be a heating furnace such as an electric furnace performing heating by passing an electric current through nichrome wires, a ceramic heat generating body or the like; or a heat insulation material provided to cover the outer circumferential portion of the synthesis furnace 2. The temperature of the reaction field 5 of the synthesis furnace 2 is preferably retained in a range of 800 to 1,300° C., more preferably 1,000 to 1,200° C., in order to, for example, suit the growth of carbon nanotubes. The heat retention unit 8 serves to manage the temperature of the reaction field 5 of the synthesis furnace 2 so as to maintain a growth temperature of CNT and achieve a longer growth time thereof. The inventors of the present invention have confirmed that high-quality single-walled carbon nanotubes (SWCNT) can be synthesized by mixing the heated catalyst raw material and the carbon raw material with the temperature of the heat retention unit 8 being 1,150 to 1,200° C. In the preset invention, the temperature of the inner portion 4 of the catalyst raw material supplying nozzle 3 for supplying the catalyst raw material to the synthesis furnace 2 may be set higher than the temperature of the reaction field 5 of the synthesis furnace 2.

The temperature of the inner portion 4 of the catalyst raw material supplying nozzle 3 is a temperature at which the catalyst raw material thermally decomposes; particularly, it may be a temperature at which the catalyst raw material thermally decomposes to generate the catalyst metal vapor. The temperature of the reaction field 5 of the synthesis furnace 2 may be a temperature at which the catalyst metal particles are generated, and CNTs are generated.

Particularly, it is preferred that the temperature of the inner portion 4 of the catalyst raw material supplying nozzle 3 be a temperature at which the catalyst metal vapor will not be condensed. For example, when supplying an argon (Ar) gas containing 0.4 Pa of ferrocene ($Fe(C_5H_5)_2$), if the temperature of the inner portion 4 of the catalyst raw material supplying nozzle 3 is about 1,400° C. or higher, a vapor of iron (Fe) as the catalyst metal can be inhibited from being condensed and generating iron particles.

By having the thermally decomposed catalyst raw material join the carbon raw material without generating the catalyst metal particles, and by generating the microscopic catalyst metal particles at a high density in the space of the reaction field 5 of the synthesis furnace 2 to then immediately start synthesizing CNTs, CNTs with a small diameter can be vapor-grown at a high density, high purity, high quality and high yield.

2. Method for Producing Carbon Nanotubes

In a method of the present embodiment for producing carbon nanotubes, as described above, the catalyst raw material is to be heated and decomposed by setting the temperature of the inner portion 4 of the catalyst raw material supplying nozzle 3 for supplying the catalyst raw material used to synthesize carbon nanotubes to the synthesis furnace 2 higher than the temperature of the reaction field 5 of the synthesis furnace 2 for synthesizing carbon nanotubes. By supplying the thermally decomposed catalyst raw material to the synthesis furnace 2 and then rapidly cooling it to the CVD temperature, carbon nanotubes can be produced without having the catalyst particles agglutinate together.

As one example of the unit for setting the temperature of the inner portion 4 of the catalyst raw material supplying nozzle 3 to a high temperature, as described above, the temperature of the inner portion 4 of the catalyst raw material supplying nozzle 3 can be adjusted by the nozzle temperature adjusting unit 6 provided inside the catalyst raw material supplying nozzle 3.

Here, the synthesis furnace 2 in FIG. 1 is formed into a vertical shape elongated in a vertical direction of the drawing; the synthesis furnace 2 may also be formed into a transverse shape elongated in a left and right direction of the drawing. Further, in this drawing, as the vertical synthesis furnace 2, the catalyst raw material and the carbon raw material are to be supplied from top down in the drawing. However, one or both of the catalyst raw material and the carbon raw material may be supplied from bottom up in the drawing, or from the transverse direction of the drawing. This also applies when the synthesis furnace 2 is of a transverse shape.

According to the CNT production device 1 and production method of the present embodiment, single-walled carbon nanotubes (SWCNT) and/or multi-walled carbon nanotubes (MWCNT) can be produced at a high density, high purity, high quality and high yield.

WORKING EXAMPLES

All the documents mentioned in this specification shall be incorporated thereinto in their entirety by citation. A working example described below is to exemplify the embodiment of the present invention, and shall not be interpreted as limiting the scope of the present invention.

Evaluations were conducted in working and comparative examples by performing laser micro-Raman spectroscopic analysis, thermogravimetry differential thermal analysis (TG-DTA) and EDS quantitative analysis, using the following methods.

<Laser Micro-Raman Spectroscopic Analysis>

The crystallizability of CNTs can, for example, be analyzed via laser micro-Raman spectroscopic analysis. In laser micro-Raman spectroscopic analysis, a peak observed near 1,590 $cm^{-1}$ is called G-band, and is derived from the in-plane stretching vibrations of carbon atoms composing a six-membered ring structure. Further, a peak observed near 1,350 $cm^{-1}$ is called D-band, and is likely to be observed when the six-membered ring structure is defective. A relative crystallizability of CNTs can be evaluated by a peak intensity ratio $I_G/I_D$ (G/D ratio) of G-band to D-band. It can be said that the higher the G/D ratio is, the higher the crystallizability of CNTs is. A peak observed near 200 $cm^{-1}$ is unique to single-walled carbon nanotubes (SWCNT) called RBM (Radial Breathing Mode) which is a mode where vibrations occur in the diametrical direction of the tubes. In this working example, a CNT bulk sample was placed in a laser micro-Raman spectrometer (model number: HR-800 by HORIBA, Ltd.), and a laser wavelength of 488 nm was used to perform laser micro-Raman spectroscopic analysis.

<Thermogravimetry Differential Thermal Analysis>

In a thermogravimetry differential thermal analysis (TG-DTA) for analyzing a carbon material, the temperature of the material is to be raised to about 1,000° C. at about 5° C./min so as to then analyze a peak temperature of burning and a residue thereof, thereby making it possible to evaluate the constituent elements and quality of the carbon material. For example, a product in FCCVD is a mixture of: a metal contained in the catalyst raw material, such as iron (Fe); CNTs; amorphous carbon (a-C); and graphitic carbon (g-C). By raising the temperature of the carbon material under the above condition, if, for example, a metal such as iron (Fe) is contained therein, an increase in mass owing to the oxidation of such metal will be observed. Normally, a-C burns at about 350 to 450° C.; CNTs and g-C start to burn at about 400° C., and completely burns out at about 700° C. In this working example, a thermal analysis device (model number: TG8120 by Rigaku Corporation) was used to perform thermogravimetry differential thermal analysis under air flow and at a temperature rise rate of 5° C./min.

<EDS (Energy Dispersive X-ray Spectroscopy) Quantitative Analysis>

Since a residue obtained after conducting thermogravimetry differential thermal analysis is an oxidized metal(s), they were subjected to EDS quantitative analysis to calculate an element ratio between carbon (C), iron (Fe) and aluminum (Al). In this working example, quantitative analysis of the residue was conducted using a scanning electron microscope (SEM) (model number: S-4800 by Hitachi High-Tech Corporation) and an energy dispersive X-ray analysis (EDX) device (model number: EDAX Genesis by AMETEK. Inc.).

Working Example 1

When Heated Both From Outside with Coil and from Inside with Heat Transfer Rod (Ethylene Raw Material)

Figure 2:
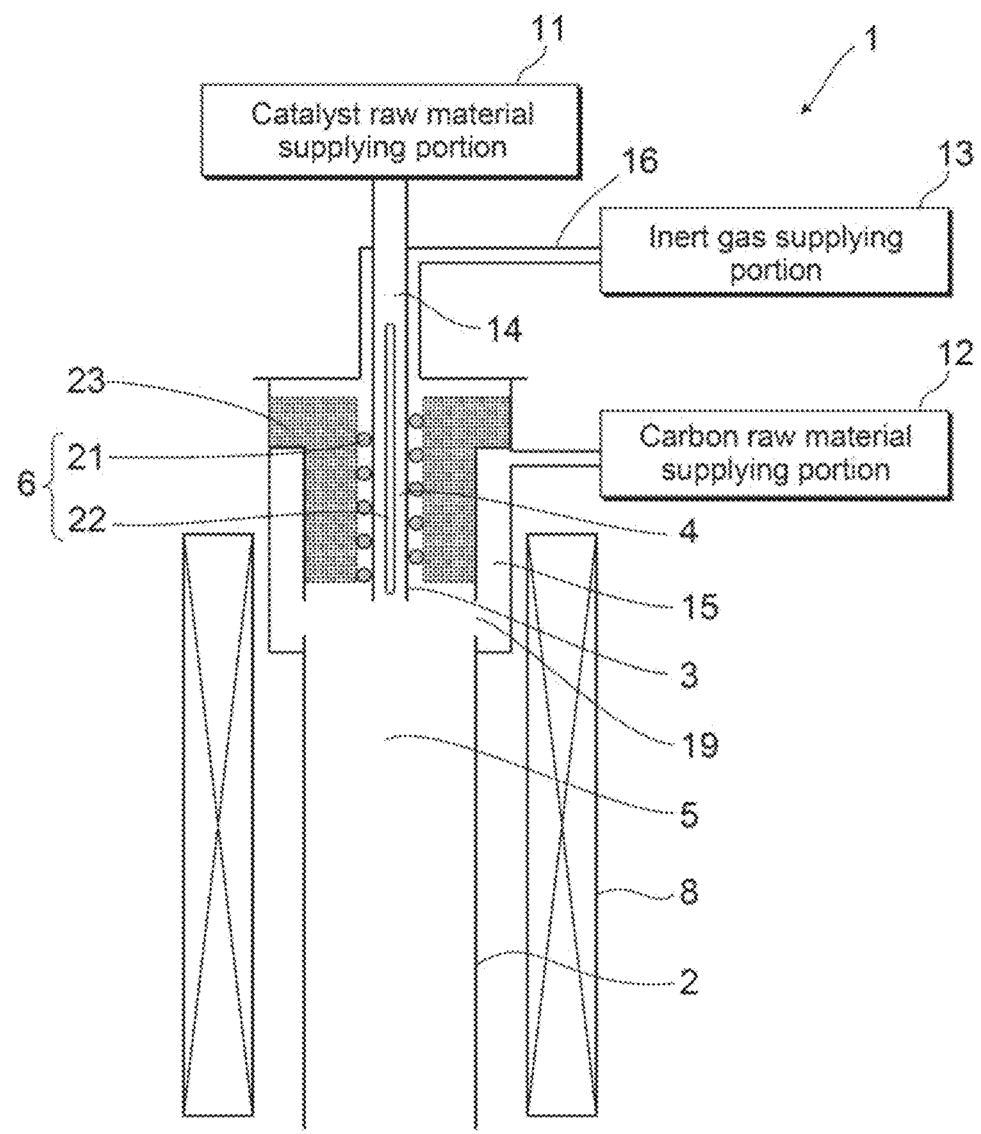
FIG. 2 is a schematic view partially showing an example of a configuration of a carbon nanotube production device of a working example 1 of the present invention.
Figure 3:
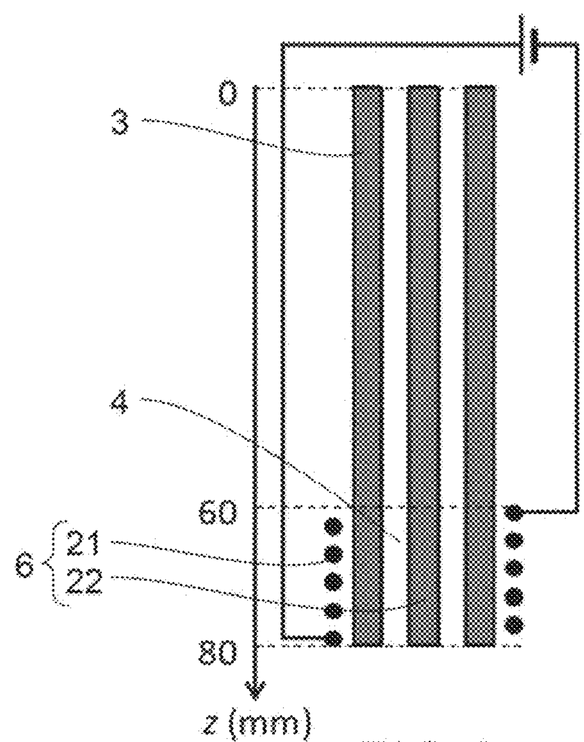
FIG. 3 is a schematic view showing a nozzle temperature adjusting unit of the working example 1 of the present invention.

FIG. 2 and FIG. 3 are schematic views partially showing an example of a configuration of a CNT production device 1 of a working example 1 of the present invention.

As shown in FIG. 2, the catalyst raw material supplying nozzle 3 is connected to the catalyst raw material supplying portion 11 for supplying the catalyst raw material and, if necessary, the cocatalyst through the catalyst raw material supplying tube 14. The carbon raw material supplying tube 15 is connected to the carbon raw material supplying portion 12 for supplying the carbon raw material. The inert gas supplying tube 16 is connected to the inert gas supplying portion 13 for supplying, if necessary, an inert gas such as argon (Ar) used for purging.

As shown in FIG. 2 and FIG. 3, as the nozzle temperature adjusting unit 6 of the working example 1, a coil 21 is provided outside the outer circumferential portion of the catalyst raw material supplying nozzle 3, and a heat transfer rod 22 is provided inside the catalyst raw material supplying nozzle 3. There are no particular restrictions on the position and length of the coil 21. With such configuration, the inner portion 4 can be heated from outside the catalyst raw material supplying nozzle 3 by energizing the coil 21, and also from within the catalyst raw material supplying nozzle 3 by the heat transfer rod 22 that has been heated by the radiation from within the catalyst raw material supplying nozzle 3, thereby allowing the temperature of the inner portion 4 of the catalyst raw material supplying nozzle 3 to be easily set high. The temperature of the inner portion 4 of the catalyst raw material supplying nozzle 3 was adjusted by the amount of electricity conducted to the coil 21.

Particularly, the temperature of the inner portion 4 of the catalyst raw material supplying nozzle 3 was set higher than the temperature of the reaction field 5 of the synthesis furnace 2. Next, the temperature of the catalyst raw material supplied from the catalyst raw material supplying portion 11 through the catalyst raw material supplying tube 14 and flowing through the catalyst raw material supplying nozzle 3, was raised to a high temperature in a short contact time. Due to the heat transfer rod 22, in the inner portion 4 of the catalyst raw material supplying nozzle 3, since a region where the catalyst raw material would decompose was evenly heated, the catalyst raw material was able to be decomposed in a short contact time.

The catalyst raw material supplying nozzle 3 and the heat transfer rod 22 were made of alumina ($Al_2O_3$); an inner diameter of the catalyst raw material supplying nozzle 3 was set to 4 mm, and a diameter of the heat transfer rod was set to 2 mm. The coil 21 provided outside the outer circumferential portion of the catalyst raw material supplying nozzle 3 was made of tungsten (W).

A numerical symbol "23" denotes a heat insulation material for keeping the inner portion 4 of the catalyst raw material supplying nozzle 3 at a high temperature.

Figure 4:
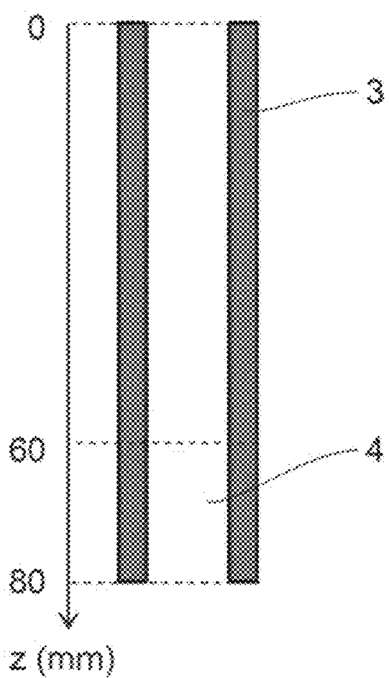
FIG. 4 is a schematic view showing a catalyst raw material supplying nozzle of a comparative example 1.

FIG. 4 shows a catalyst raw material supplying nozzle 3 used in a CNT production device of a comparative example 1. There was used a catalyst raw material supplying nozzle 3 identical to that used in the present working example; there were not employed the heat transfer rod 22 and the coil 21 provided outside the outer circumferential portion of the catalyst raw material supplying nozzle 3, and the catalyst raw material was supplied to the reaction field 5 of the synthesis furnace 2 without being heated. The rest of the configurations were identical to those of the working example 1.

Figure 5:
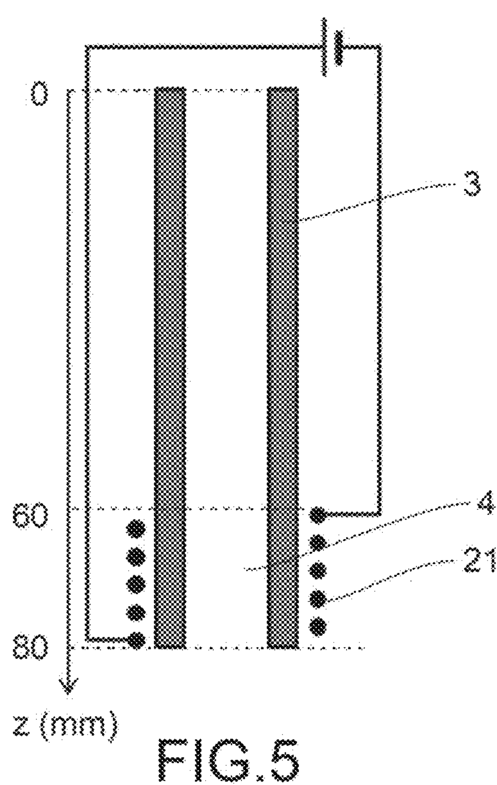
FIG. 5 is a schematic view showing a catalyst raw material supplying nozzle and a coil for electric heating of a comparative example 2.

FIG. 5 shows a CNT production device of a comparative example 2 that includes the catalyst raw material supplying nozzle 3 and the coil 21 provided outside the outer circumferential portion of the catalyst raw material supplying nozzle 3. Using a catalyst raw material supplying nozzle 3 and coil 21 that are identical to those used in the present working example, and without installing the heat transfer rod 22, the coil 21 was electrically heated such that the inner portion 4 of the catalyst raw material supplying nozzle 3 was heated only via the heating unit provided outside the catalyst raw material supplying nozzle 3. The rest of the configurations were similar to those of the working example 1.

Figure 6:
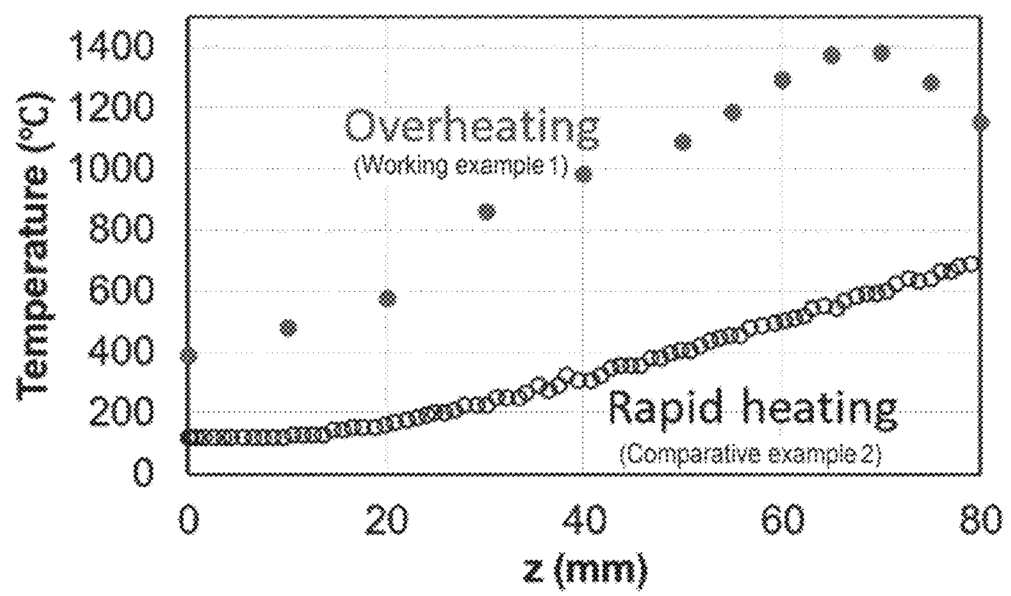
FIG. 6 is a graph showing a temperature distribution in a depth direction of an inner portion of the catalyst raw material supplying nozzle of the working example 1 and the comparative example 2 of the present invention.

FIG. 6 is a graph showing a change in temperature in a depth direction of the inner portion 4 when flowing a total of 2 SLM of a gas through the catalyst raw material supplying nozzle 3. In the working example 1, the temperature was measured using a thermocouple (not shown) provided in the center of the catalyst raw material supplying nozzle 3. In the comparative example 2, a temperature in a central portion of the catalyst raw material supplying nozzle 3 was calculated via fluid analysis using a general-purpose numerical value fluid analyzing software (ANSYS Fluent). The set temperature of the heat retention unit 8 (Furnace) was 1,150° C. In the comparative example 2, although the temperature rose toward a flow outlet of the catalyst raw material supplying nozzle 3, the temperature only rose to a temperature lower than 1,150° C. In contrast, in the working example 1, the temperature reached 1,150° C. at 50 to 55 mm of the catalyst raw material supplying nozzle 3 in a depth direction thereof where the coil is already gradually wound therearound, and a temperature of the inner portion 4 of the catalyst raw material supplying nozzle 3 from such location to the flow outlet became higher than the set temperature (1,150° C.) of the heat retention unit 8. A maximum value of the temperature of the inner portion 4 was about 1,400° C. In the working example 1, the gas of the flow rate of 2 SLM passes through a gap of a cross-sectional area of 0.0942 $cm^2$ between the catalyst raw material supplying nozzle 3 having the inner diameter of 4 mm and the heat transfer rod having the diameter of 2 mm. The flow rate of the gas was 33.3 $cm^3/s$ at 0° C., and became 204 $cm^3/s$ when heated to 1,400° C. The gas passed through the gap of the cross-sectional area of 0.0942 $cm^2$ at 2,170 cm/s on average, and a time spent in passing by 2 cm of the heated portion of the catalyst raw material supplying nozzle 3 was 0.9 ms on average. The temperature of the reaction field 5 of the synthesis furnace 2 was either at the same level of or lower than the set temperature (1,150° C.) of the heat retention unit 8.

In each of the working example 1, comparative example 1 and comparative example 2, there were used an identical catalyst raw material, an identical carbon raw material, an identical gaseous species of the purge gas and carrier gas, an identical gas flow rate, an identical gas temperature and an identical set temperature of the heat retention unit 8.

By passing 0.5 SLM of an argon (Ar) gas through ferrocene ($Fe(C_5H_5)_2$) as a catalyst raw material that had been heated to 80° C., a ferrocene vapor-containing argon gas was supplied to the catalyst raw material supplying tube 14 from the catalyst raw material supplying portion 11. Further, by passing 1.0 SLM of an argon (Ar) gas through sulfur (S) as a cocatalyst that had been heated to 108° C., a sulfur vapor-containing argon gas was supplied to the catalyst raw material supplying tube 14 from the catalyst raw material supplying portion 11. Moreover, an argon (Ar) gas as a carrier gas was supplied to the catalyst raw material supplying tube 14 at 120° C. and 0.5 SLM. An argon (Ar) gas was supplied from the inert gas supplying portion 13 to the inert gas supplying tube 16 at 1.0 SLM. Ethylene ($C_2H_4$) as the carbon raw material was supplied from the carbon raw material supplying portion 12 to the carbon raw material supplying tube 15 at 0.05 SLM. In addition, a hydrogen ($H_2$) gas was supplied to the carbon raw material supplying tube 15 at 0.5 SLM, and an argon (Ar) gas as a carrier gas was supplied to the carbon raw material supplying tube 15 at 1.5 SLM. As the heat retention unit 8, an electric furnace was provided outside the outer circumferential portion of the synthesis furnace 2, and the temperature of the electric furnace was set to 1,150° C.

Figure 7:
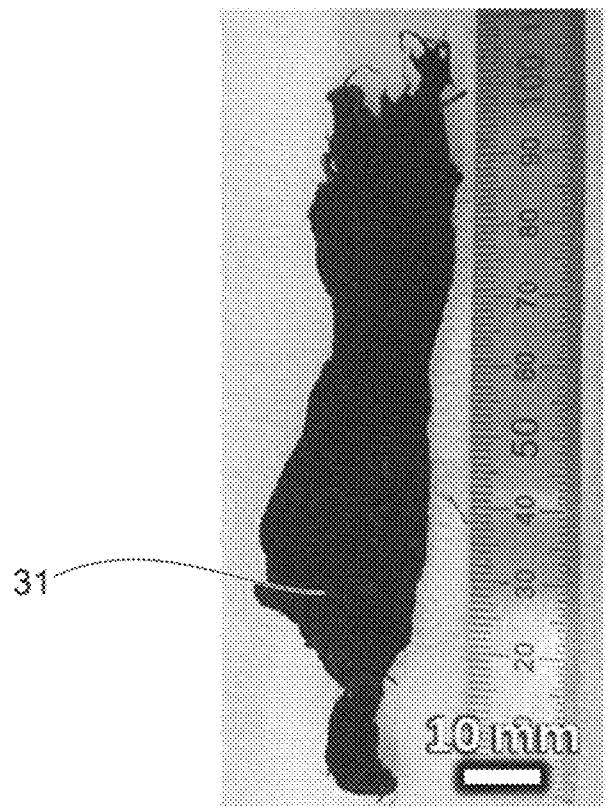
FIG. 7 is a photograph of CNTs produced in the working example 1 of the present invention.

As shown in a photograph of FIG. 7, in the working example 1, CNTs were produced as an aggregate 31. The length of the aggregate taken out from the reaction tube was about 10 cm. Various evaluations of the CNTs produced in the working example 1, comparative example 1 and comparative example 2 are collectively shown in Table 1. Described hereunder are details of each evaluation result.

TABLE 1

| | Productivity [mg/min] | Carbon purity [wt %] | $I_G/I_D$ [—] | CNT diameter [nm] | σ [nm] |
|---|---|---|---|---|---|
| Comparative example 1 | 2.80 | 80.6 | 11 (σ = 3.3) | 2.22 | ±0.90 |
| Comparative example 2 | 3.81 | 71.7 | 55 (σ = 5.1) | 1.69 | ±0.63 |
| Working example 1 | 5.73 | 84.9 | 57 (σ = 3.1) | 1.55 | ±0.43 |

<EDS Quantitative Analysis Result (Productivity and Carbon Purity)>

Figure 8:
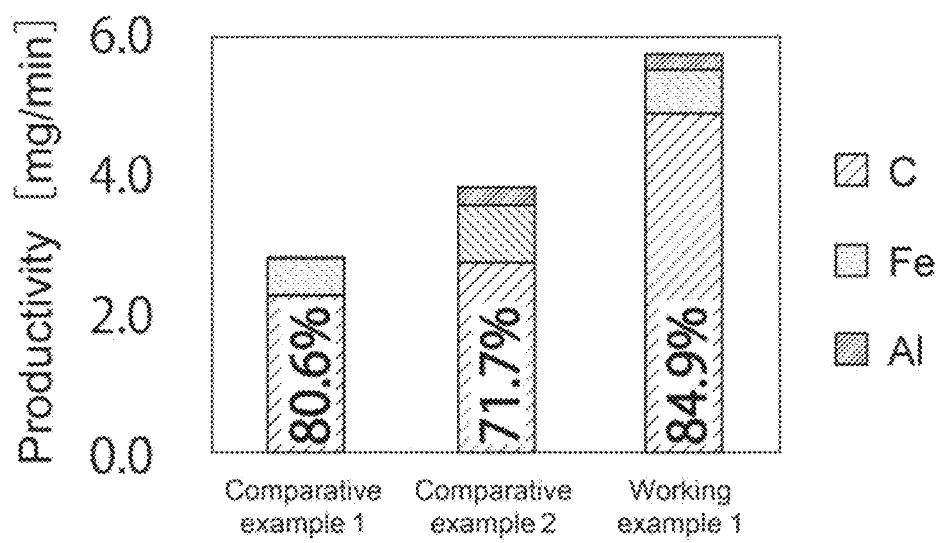
FIG. 8 is a graph showing a CNT productivity and EDS quantitative analysis results of residues obtained after thermogravimetry differential thermal analysis in the working example 1, comparative example 1 and comparative example 2 of the present invention.

The results of a productivity and the element ratios are shown in FIG. 8. The productivity was calculated as a yield per unit time based on the yield of CNTs and a synthesis time. The productivity in the working example 1 was 5.73 mg/min which was higher than 2.80 mg/min in the comparative example 1 and 3.81 mg/min in the comparative example 2.

EDS quantitative analysis was performed on a residue obtained after performing a later-described thermogravimetry differential thermal analysis (TG-DTA). As for a ratio of the carbon (C) derived from CNTs to the iron (Fe) derived from ferrocene ($Fe(C_5H_5)_2$) as the catalyst raw material and the aluminum (Al) derived from alumina ($Al_2O_3$) of the catalyst raw material supplying nozzle 3, the ratio in the working example 1 was 84.9 wt % which was higher than 80.6 wt % in the comparative example 1 and 71.7 wt % in the comparative example 2.

As can be seen from above, it was indicated that the working example 1 provides a CNT production device and method having a high productivity, and that CNTs with a high purity can be produced thereby.

<Laser Micro-Raman Spectroscopic Analysis Result (Crystallizability)>

Figure 9:
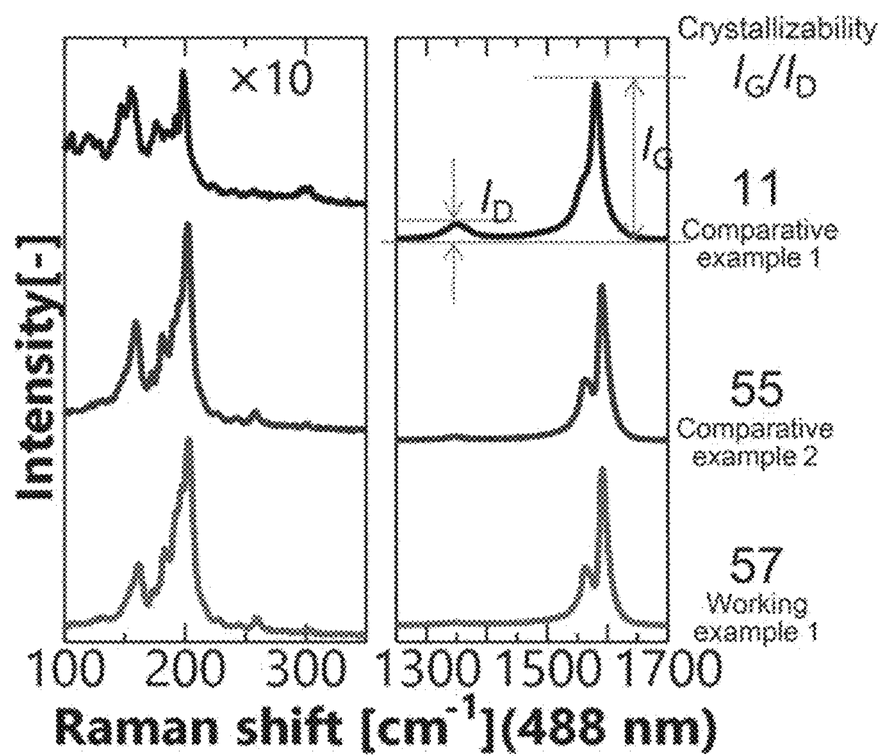
FIG. 9 is a diagram showing a Raman spectrum of CNTs produced in the working example 1, comparative example 1 and comparative example 2 of the present invention.

FIG. 9 is a Raman spectrum of the CNTs produced. As a result of calculating $I_G/I_D$ (G/D ratio), the ratio in the working example 1 was 57 which was higher than 11 in the comparative example 1 and 55 in the comparative example 2. There was also observed the RBM peak occurring near 200 $cm^{-1}$. Thus, in the working example 1, it was indicated that SWCNTs with a high crystallizability were able to be produced.

<Thermogravimetry Differential Thermal Analysis Result (Catalyst Utilization Efficiency)>

Figure 10:
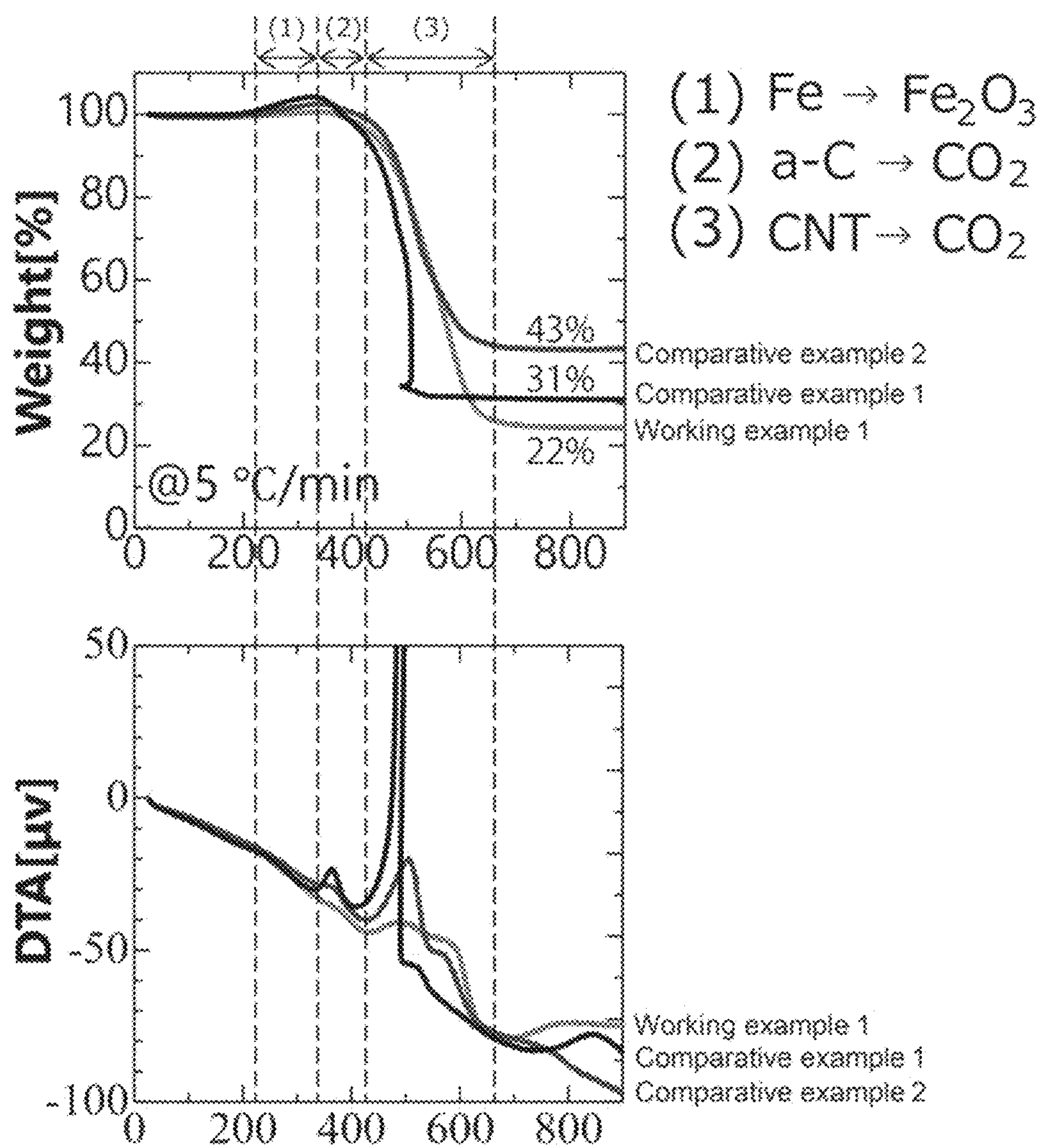
FIG. 10 is a set of diagrams showing thermogravimetry differential thermal analysis results of the CNTs produced in the working example 1, comparative example 1 and comparative example 2 of the present invention.
Figure 13:
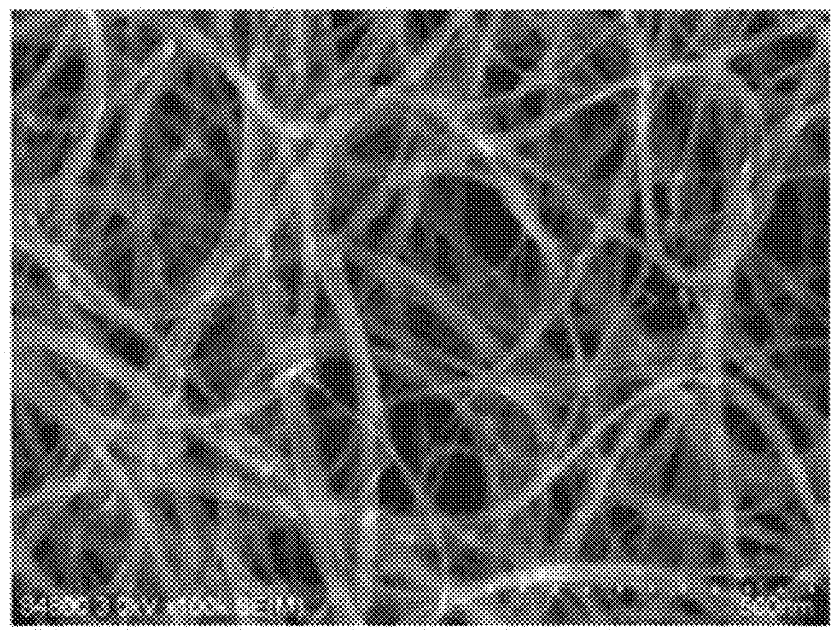
FIG. 13 is a SEM image of the CNTs produced in the working example 2a of the present invention.
Figure 14:
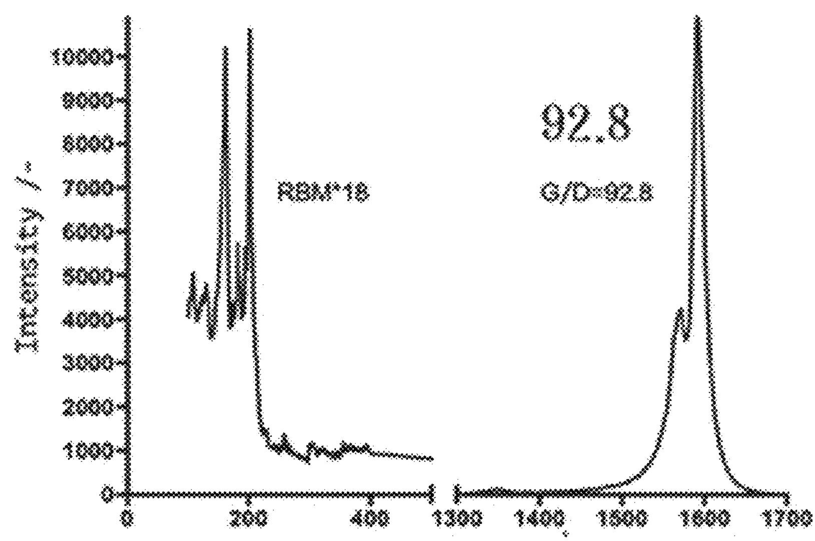
FIG. 14 is a diagram showing a Raman spectrum of CNTs produced in a working example 2b of the present invention.
Figure 15:
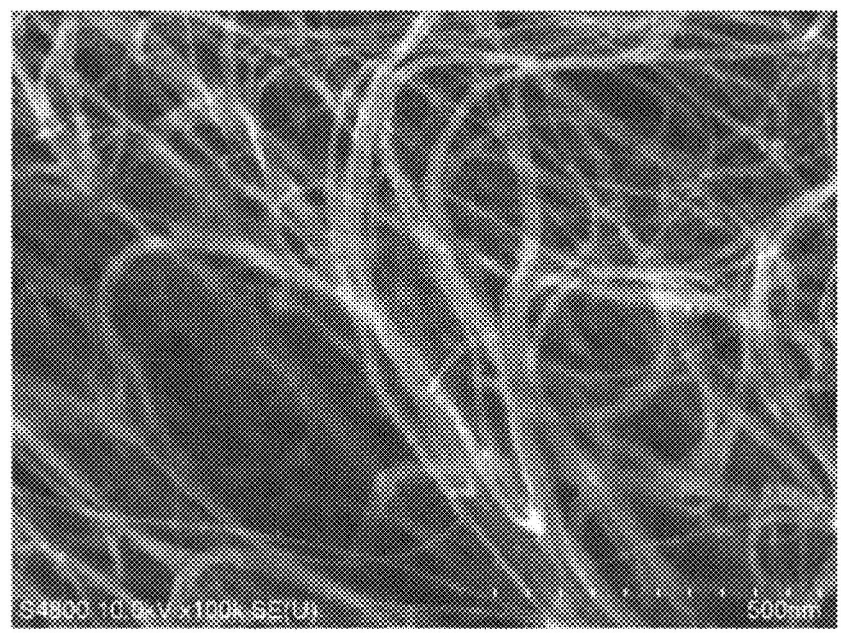
FIG. 15 is a SEM image of the CNTs produced in the working example 2b of the present invention.
Figure 16:
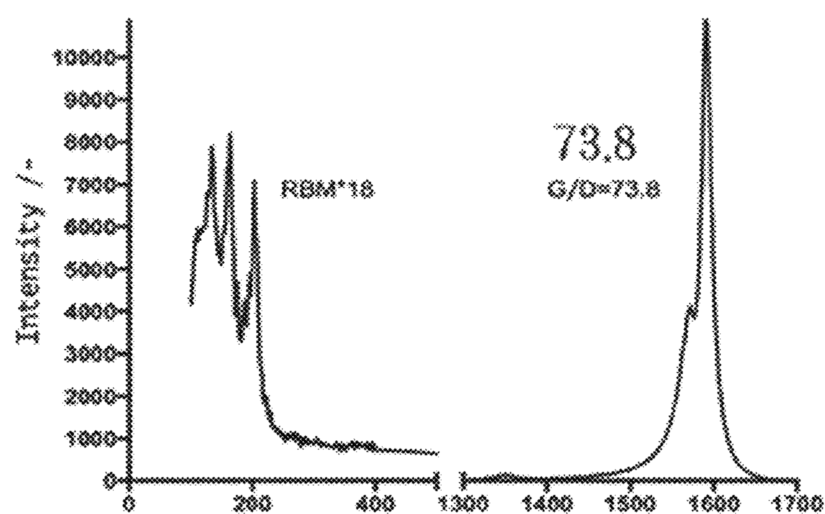
FIG. 16 is a diagram showing a Raman spectrum of CNTs produced in a working example 2c of the present invention.
Figure 17:
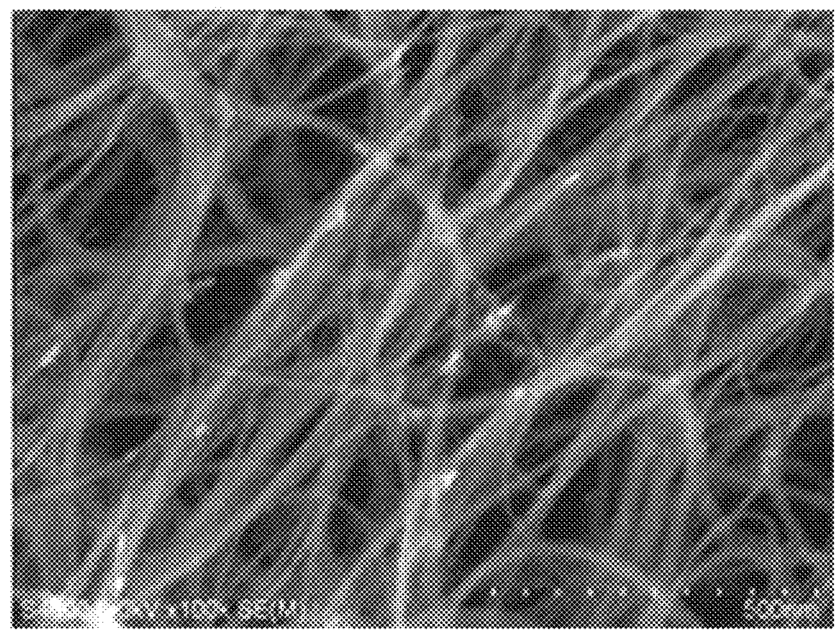
FIG. 17 is a SEM image of the CNTs produced in the working example 2c of the present invention.
Figure 18:
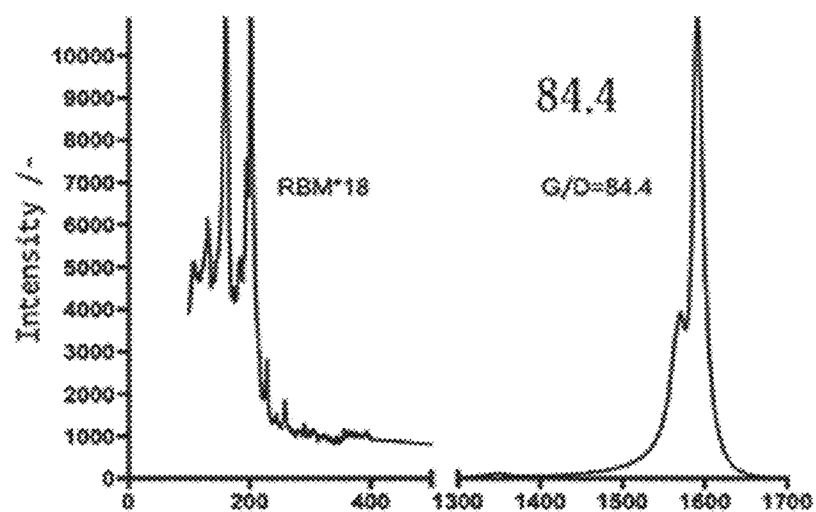
FIG. 18 is a diagram showing a Raman spectrum of CNTs produced in a working example 2d of the present invention.
Figure 19:
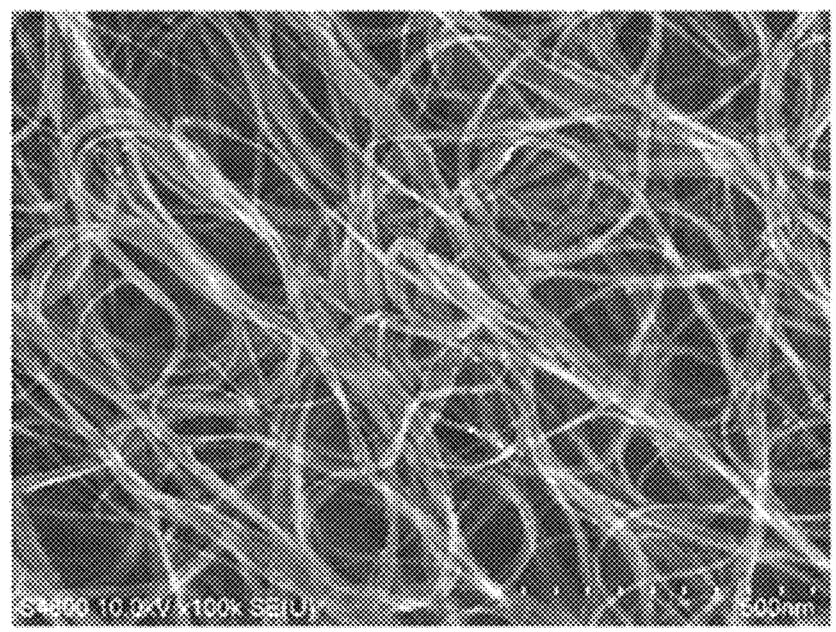
FIG. 19 is a SEM image of the CNTs produced in the working example 2d of the present invention.
Figure 20:
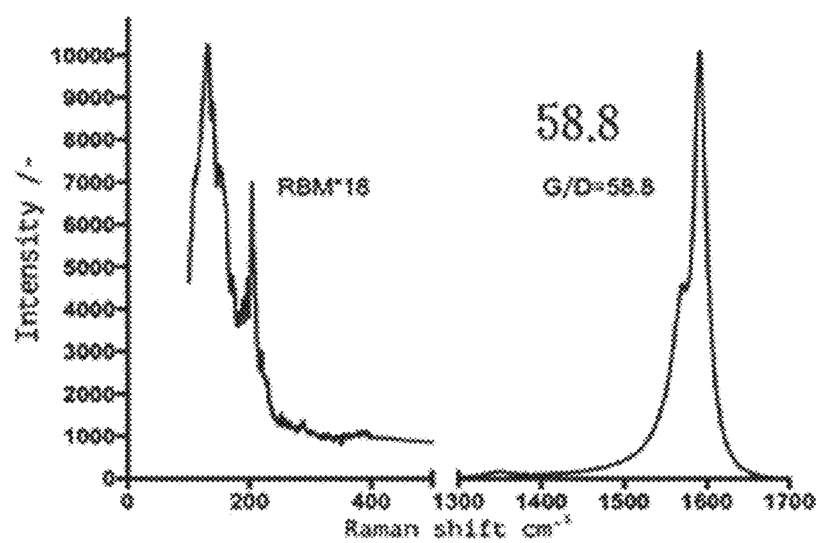
FIG. 20 is a diagram showing a Raman spectrum of CNTs produced in a working example 2e of the present invention.
Figure 21:
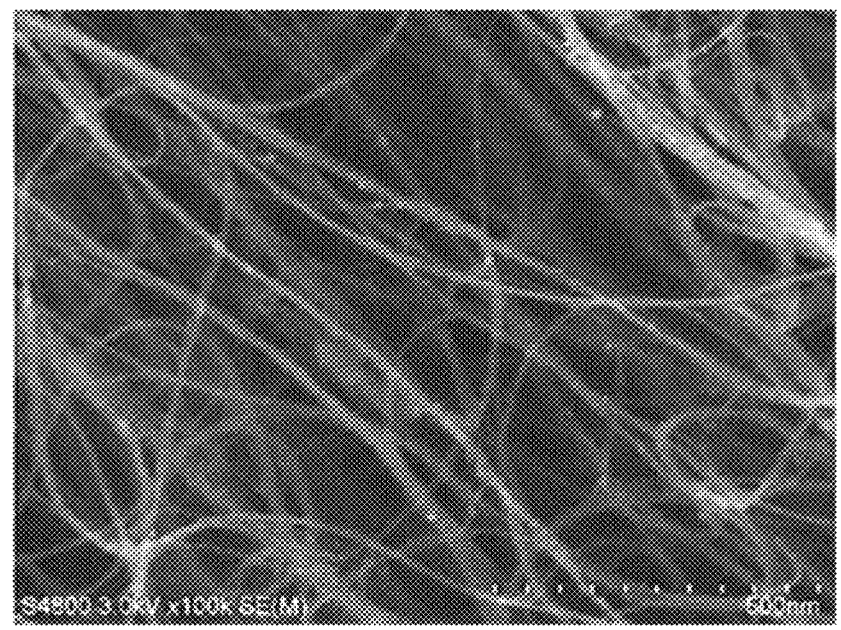
FIG. 21 is a SEM image of the CNTs produced in the working example 2e of the present invention.

An upper graph in FIG. 10 is a graph showing a thermogravimetric analysis (TG) result of the CNTs produced; a lower graph in FIG. 10 is a graph showing a differential thermal analysis result (DTA). Table 2 shows the evaluation results of thermogravimetry differential thermal analysis. As for the result of TG, in the working example 1, the mass increased in the beginning due to the oxidation of iron (Fe) as the catalyst ((1) in the graph). A peak of mass increase in the working example 1 was smaller than those in the comparative examples 1 and 2. Burning started at about 350° C. Based on a peak change in DTA, it can be concluded that a range of about 350° C. to about 420° C. was where the burning of amorphous carbon (a-C) took place ((2) in FIG. 10), and that a range of about 420° C. to about 650° C. was where the burning of CNTs took place ((3) in the graph). In the working example 1, the amount of the ashes of the residue was 22 wt % as compared to before burning, which was smaller than 30 wt % in the comparative example 1 and 43 wt % in the comparative example 2. Thus, it was indicated that in the working example 1, the utilization efficiency of the catalyst was able to be improved.

TABLE 2

| | Burnout [° C.] | a - C | Crystallizability | Residue amount [Wt %] |
|---|---|---|---|---|
| Comparative example 1 | 500 | Many | Low | 30 |
| Comparative example 2 | 700 | Few | High | 43 |
| Working example 1 | 700 | Few | High | 22 |

<Observational Result by Scanning Electron Microscope (SEM) and Transmission Electron Microscope (TEM)>

FIG. 11 includes a SEM image (FIG. 11A) of the CNTs produced in the working example 1; and a TEM image thereof (FIG. 11B). As shown in the SEM image, it was indicated that the number of the particles was small. That is, it was indicated that the number of the catalyst metal particles that were not used for synthesizing CNTs was small, whereas the number of the catalyst metal particles that were effective in growing the CNTs had increased.

The TEM image indicates that SWCNT 32 was produced. There, the diameter of the CNTs and the distribution thereof were observed by TEM.

The diameter of the CNTs produced in the working example 1 was 1.55 nm on average which was smaller than 2.22 nm in the comparative example 1 and 1.69 nm in the comparative example 2. In this way, it was indicated that in the working example 1, CNTs with a small diameter were able to be produced by thermally decomposing the catalyst raw material, mixing the decomposed catalyst metal raw material with the carbon source gas to then rapidly perform cooling to the CVD temperature so as to generate the microscopic catalyst metal particles and immediately generate CNTs.

A standard deviation $\sigma$ of the diameter of the CNTs produced in the working example 1 was 0.43 which was smaller than 0.90 in the comparative example 1 and 0.63 in the comparative example 2. In this way, it was indicated that by using the heat transfer rod 22, the temperature distribution in the inner portion 4 of the catalyst raw material supplying nozzle 3 will be even such that the thermal decomposition of the catalyst raw material shall spatially evenly take place, and that as a result, the catalyst metal particles are able to be spatially evenly generated.

Working Example 2

When Heated Both from Outside with Coil and from Inside with Heat Transfer Rod (Methane Raw Material)

Carbon nanotubes were synthesized in a manner such that a device identical to that used in the working example 1 was used, a catalyst raw material-containing argon (Ar) gas was passed through the catalyst raw material supplying tube 14 from the catalyst raw material supplying portion 11 under a condition identical to that of the working example 1, and as the carbon source, methane ($CH_4$) was used instead of ethylene ($C_2H_4$). Other synthesis conditions for working examples 2a to 2h are as shown in Table 3; experiments were conducted by changing the temperature of the synthesis furnace 2 in a range of 1,150 to 1,200° C. The temperature of the inner portion of the catalyst raw material supplying nozzle is as shown in FIG. 6; and a region having a temperature higher than that of the synthesis furnace 2 was set to be about 20 mm.

FIGS. 12, 14, 16, 18, 20, 23, 26 and 28 are all Raman spectra of the CNTs produced in the working examples 2a to 2h; $I_G/I_D$ (G/D ratio) in each working example was calculated. FIGS. 13, 15, 17, 19, 21, 24, 27 and 29 are all SEM images of the CNTs produced in the working examples 2a to 2h.

The evaluation results are shown in Table 3. Under any of the conditions employed in the working examples 2a to 2h, the G/D ratio was not lower than 58.8, and the productivity was not lower than 5.31 mg/min; carbon nanotubes were able to be synthesized at a quality and quantity higher than those of the comparative examples 1 and 2.

Figure 22:
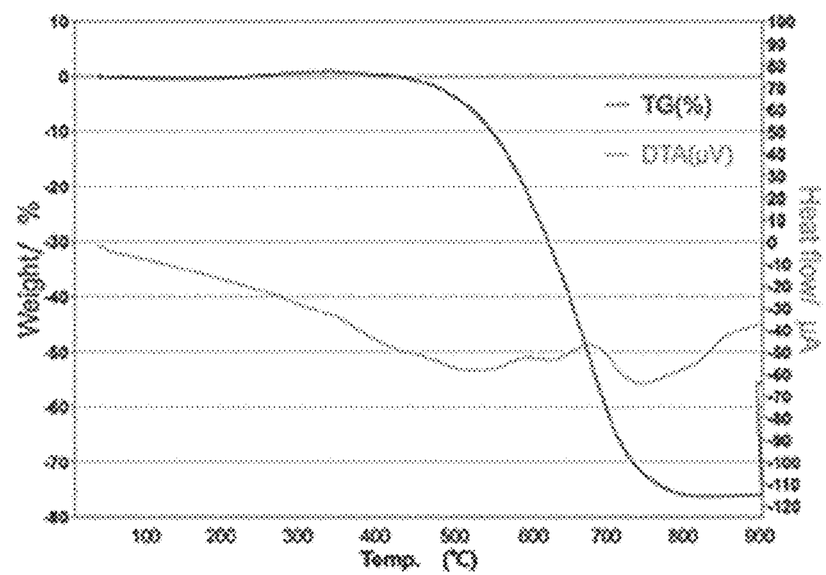
FIG. 22 is a diagram showing a thermogravimetry differential thermal analysis result of the CNTs produced in the working example 2e of the present invention.
Figure 23:
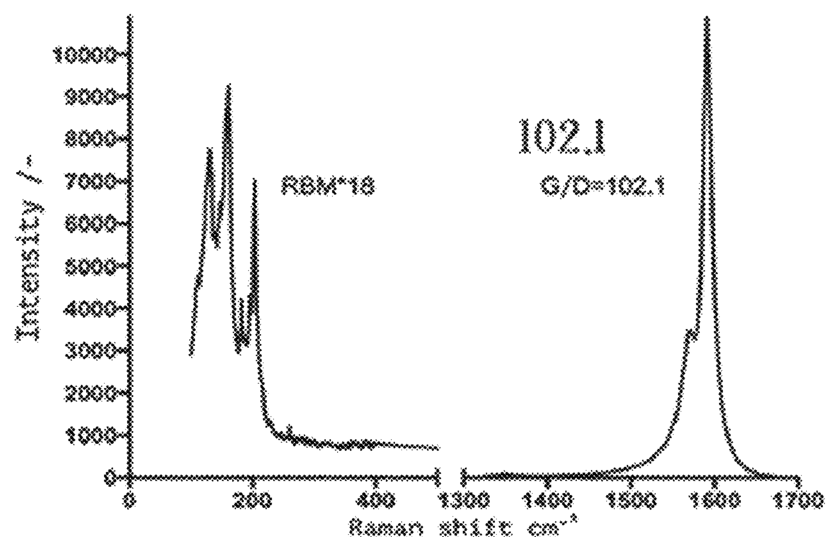
FIG. 23 is a diagram showing a Raman spectrum of CNTs produced in a working example 2f of the present invention.
Figure 24:
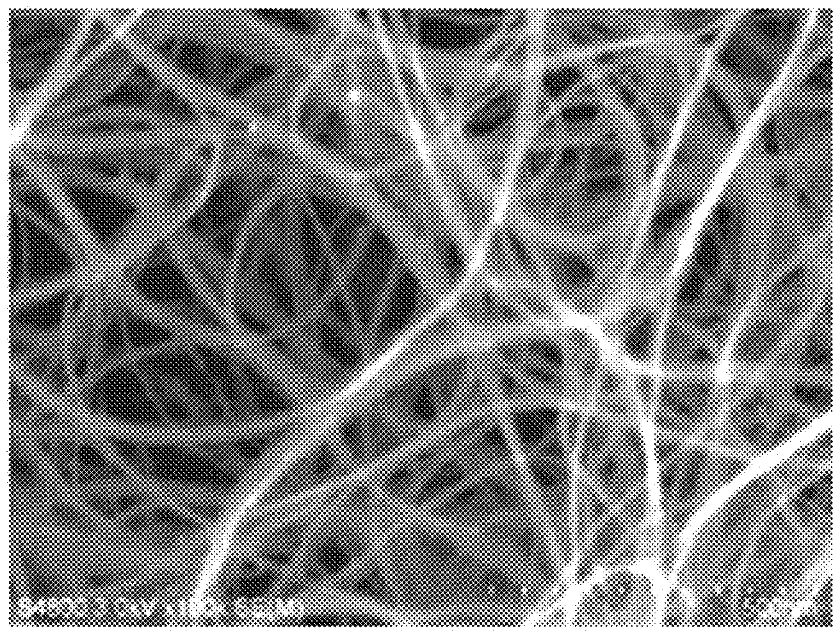
FIG. 24 is a SEM image of the CNTs produced in the working example 2f of the present invention.
Figure 25:
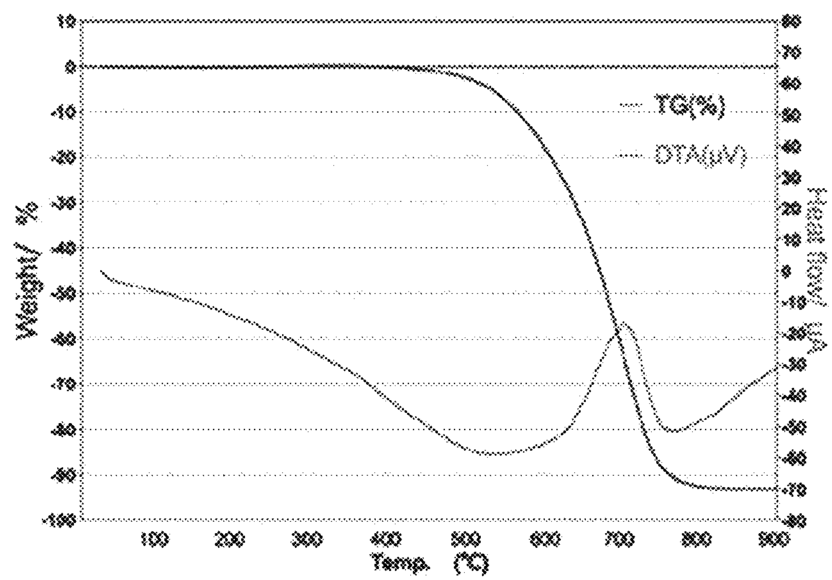
FIG. 25 is a diagram showing a thermogravimetry differential thermal analysis result of the CNTs produced in the working example 2f of the present invention.
Figure 26:
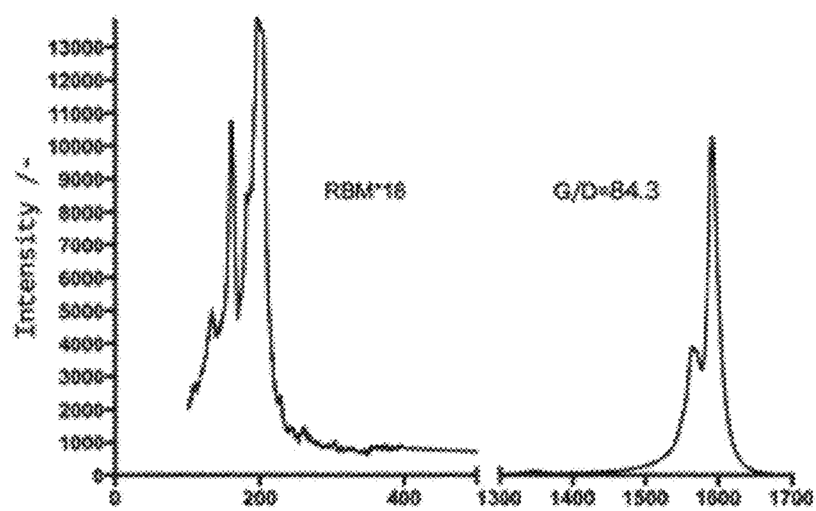
FIG. 26 is a diagram showing a Raman spectrum of CNTs produced in a working example 2g of the present invention.
Figure 27:
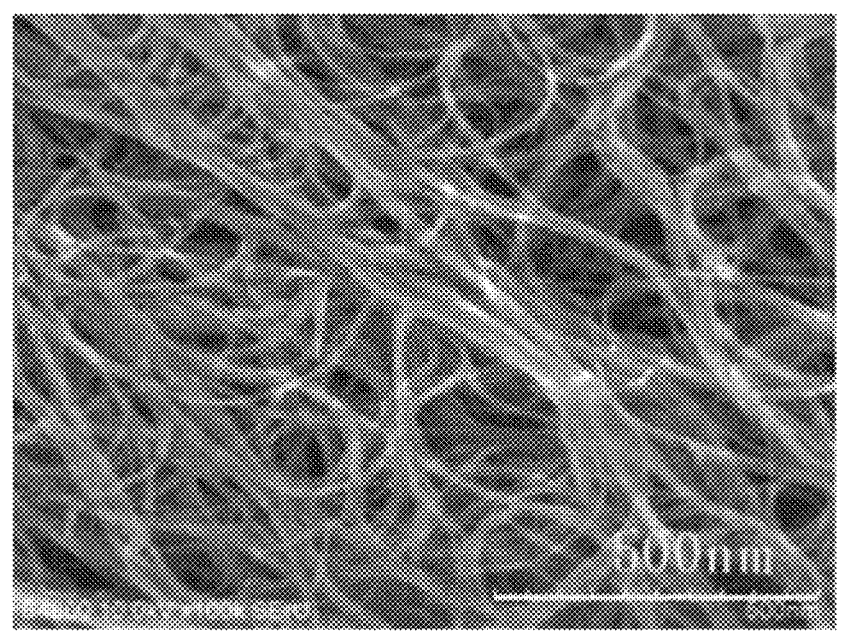
FIG. 27 is a SEM image of the CNTs produced in the working example 2g of the present invention.
Figure 28:
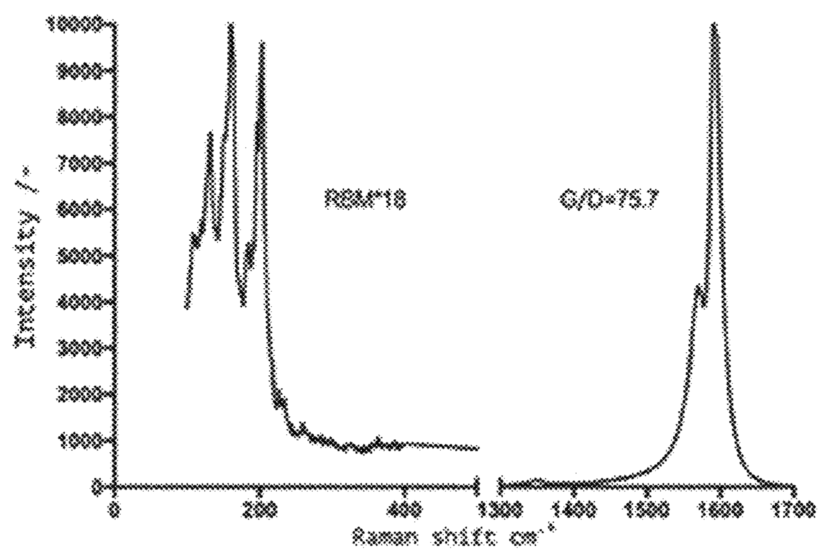
FIG. 28 is a diagram showing a Raman spectrum of CNTs produced in a working example 2h of the present invention.
Figure 29:
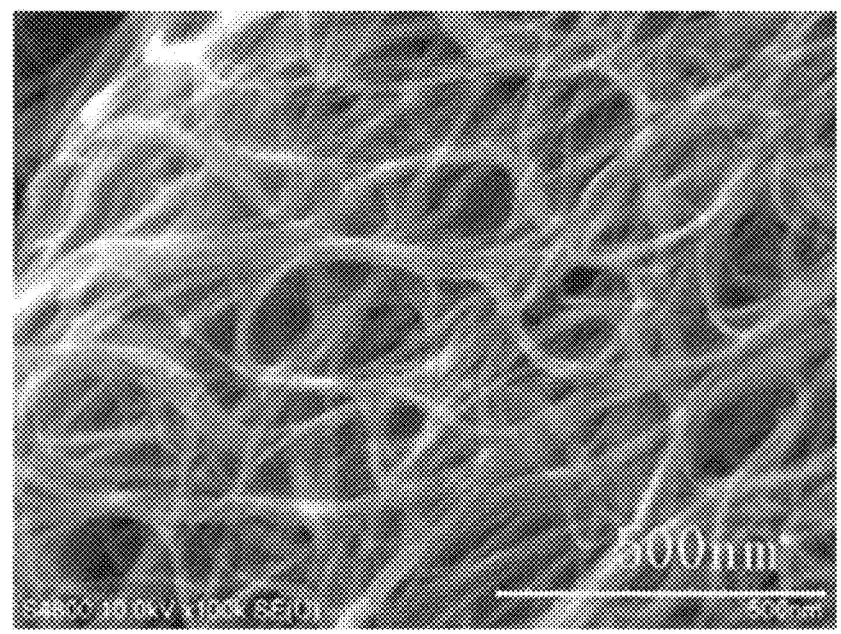
FIG. 29 is a SEM image of the CNTs produced in the working example 2h of the present invention.
Figure 30:
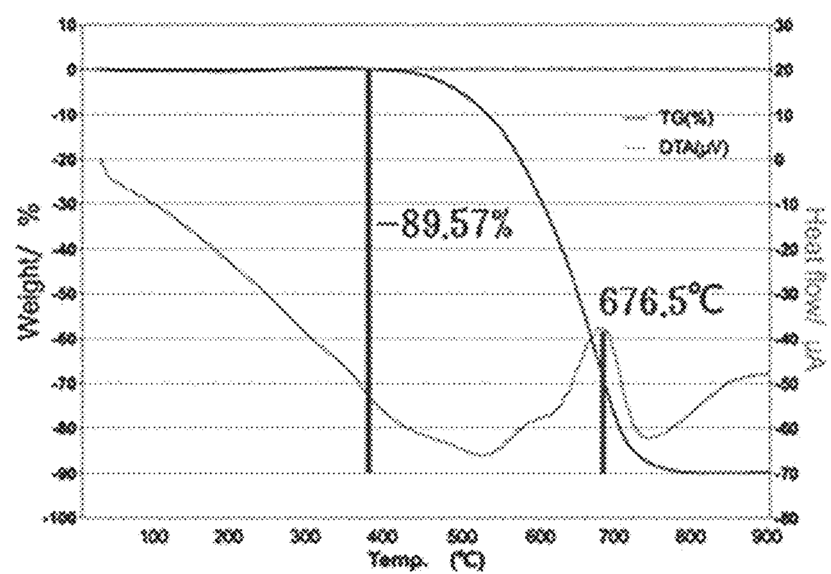
FIG. 30 is a diagram showing a thermogravimetry differential thermal analysis result of the CNTs produced in the working example 2h of the present invention.

With regard to the working examples 2e, 2f and 2h, thermogravimetry differential thermal analysis (TG-DTA) was performed (FIGS. 22, 25 and 30). As shown in Table 3, the amount of the ashes of the residue was not larger than 23.1 wt % as compared to before burning, which was smaller than those in the comparative examples 1 and 2.

As for the working example 2h, EDS quantitative analysis was performed on a residue obtained after performing thermogravimetry differential thermal analysis (TG-DTA). The ratio of the carbon (C) derived from CNTs to the iron (Fe) derived from ferrocene ($Fe(C_5H_5)_2$) as the catalyst raw material and the aluminum (Al) derived from alumina ($Al_2O_3$) of the catalyst raw material supplying nozzle 3 was 92.7 wt % which was higher than those in the comparative examples 1 and 2.

In the present working example, the nozzle temperature adjusting unit 6 is the heater 7. This heater 7 is composed of carbon, and is electrically heated so as to then adjust the temperature of the inner portion 4 of the catalyst raw material supplying nozzle 3 by changing the amount of electricity conducted. The catalyst raw material supplying nozzle 3 can be made of a heat-resistant ceramics material; for example, it may be a cylinder made of zirconia ($ZrO_2$). The heater 7 may, for example, be formed into an inverted U shape with a slit 18 being provided in a C/C composite (carbon fiber-reinforced carbon composite material) sheet, and be arranged inside the catalyst raw material supplying nozzle 3. A Ni-made electrode 9 may, for example, be connected to the heater 7 so as to electrically conduct the heater 7 through such electrode 9. Since the heater 7 will

TABLE 3

| | Heat retention unit 8 | Catalyst raw material supplying tube 14 | | | Inert gas supplying tube 16 | Carbon raw material supplying portion 12 | | | | | | Residue |
|---|---|---|---|---|---|---|---|---|---|---|---|---|
| Working example | Temperature (° C.) | Fc + Ar (SLM) | S + Ar (SLM) | Ar (SLM) | Ar (SLM) | $CH_4$ (SLM) | $H_2$ (SLM) | Ar (SLM) | Total (SLM) | $I_G/I_D$ [—] | Productivity [mg/min] | amount [Wt %] |
| 2a | 1150 | 0.50 | 1.00 | 0.50 | 0.20 | 0.35 | 2.00 | 0.50 | 5.05 | 81.6 | 5.31 | — |
| 2b | 1200 | 0.50 | 1.00 | 0.50 | 0.20 | 0.35 | 2.00 | 0.50 | 5.05 | 92.8 | 6.76 | — |
| 2c | 1150 | 0.50 | 1.00 | 0.50 | 0.20 | 0.35 | 1.75 | 0.70 | 5.00 | 73.8 | 7.81 | — |
| 2d | 1200 | 0.50 | 1.00 | 0.50 | 0.20 | 0.35 | 1.75 | 0.70 | 5.00 | 84.4 | 7.19 | — |
| 2e | 1150 | 0.50 | 1.00 | 0.50 | 0.20 | 0.35 | 1.45 | 1.00 | 5.00 | 58.8 | 8.16 | 23.1 |
| 2f | 1200 | 0.50 | 1.00 | 0.50 | 0.20 | 0.35 | 1.45 | 1.00 | 5.00 | 102.1 | 8.03 | 6.7 |
| 2g | 1200 | 0.50 | 1.00 | 0.50 | 0.20 | 0.35 | 1.55 | 0.90 | 5.00 | 84.3 | 10.5 | — |
| 2h | 1200 | 0.50 | 1.00 | 0.50 | 0.20 | 0.35 | 2.05 | 0.40 | 5.00 | 75.7 | 12.1 | 10.4 |

Working Example 3

When Heated from Inside with Carbon Heater

FIG. 31 is a schematic view partially showing an example of a configuration of a CNT production device 1 of a working example 3 of the present invention.

As shown in FIG. 31, the nozzle temperature adjusting unit 6 is provided inside the catalyst raw material supplying nozzle 3. This configuration allows the temperature of the inner portion 4 of the catalyst raw material supplying nozzle 3 to be easily set high, and even higher than the temperature of the reaction field 5 of the synthesis furnace 2. Further, the temperature of the catalyst raw material supplied from the catalyst raw material supplying portion 11 through the catalyst raw material supplying tube 14 and flowing through the catalyst raw material supplying nozzle 3, can be raised to a high temperature in a short period of time. With this configuration, since the temperature of the catalyst raw material supplying nozzle can be maintained lower than that of the nozzle temperature adjusting unit 6, when the temperature of the nozzle temperature adjusting unit 6 is set to an especially high temperature, the catalyst raw material whose temperature has been raised will be thermally decomposed at a high temperature and in a short period of time to generate a catalyst metal vapor, and the catalyst metal vapor thus generated will then be supplied to the reaction field 5 of the synthesis furnace 2 without being condensed.

Further, by installing the nozzle temperature adjusting unit 6 inside the catalyst raw material supplying nozzle 3, a thermal damage of the catalyst raw material supplying nozzle 3 can be inhibited as compared to when performing heating from outside by installing a coil outside the outer circumferential portion of the catalyst raw material supplying nozzle 3.

heat the catalyst raw material to a temperature higher than the temperature of the reaction field 5 of the synthesis furnace 2, the nucleation of the metal particles from the catalyst raw material can be inhibited from occurring in the catalyst raw material supplying nozzle 3. The heated catalyst raw material will then be supplied to the reaction field 5 of the synthesis furnace 2 as the catalyst metal vapor.

A numerical symbol "17" denotes the carbon raw material flow passage that is provided outside the outer circumferential portion of the catalyst raw material supplying nozzle 3, and allows the carbon raw material to flow therethrough. The carbon raw material is supplied from the carbon raw material supplying portion 12 to the carbon raw material flow passage 17 through the carbon raw material supplying tube 15. Although the carbon raw material flows outside the outer circumferential portion of the catalyst raw material supplying nozzle 3 whose inner portion 4 has been heated to a temperature higher than the temperature of the reaction field 5 of the synthesis furnace 2, since a heat-insulating catalyst raw material supplying nozzle 3 is used, the carbon raw material can be efficiently preheated to the extent that it will not decompose. In this case, not only there can be prevented the generation of a by-product(s) or the like causing catalyst inactivation, but the thermally decomposed catalyst raw material and the carbon raw material can be rapidly mixed together. If using methane ($CH_4$) as the carbon raw material, by adjusting a preheating temperature, there can also be generated via preheating carbon sources for promoting the synthesis of CNTs, such as acetylene ($C_2H_2$) and ethylene ($C_2H_4$).

Figure 32:
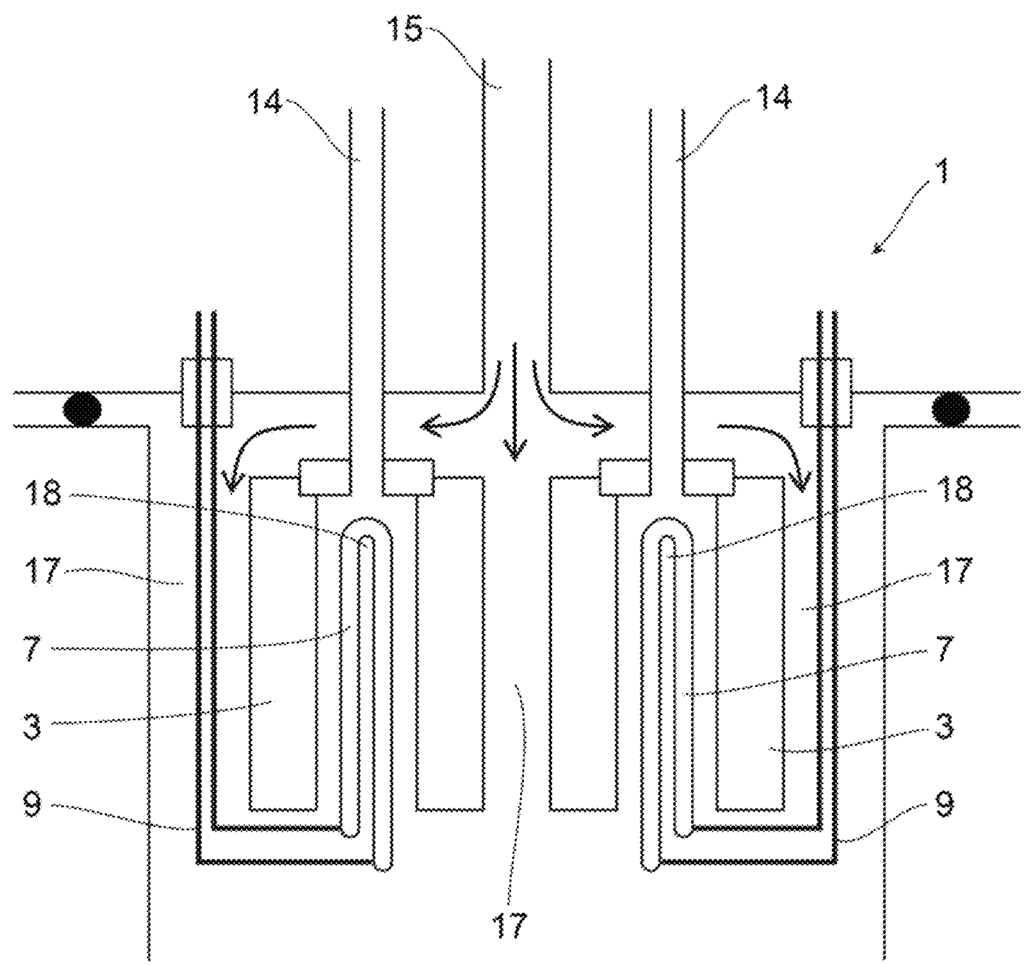
FIG. 32 is a side cross-sectional view partially showing an example of the CNT production device of the working example 3 of the present invention that is configured to have a plurality of catalyst raw material supplying nozzles.
Figure 33:
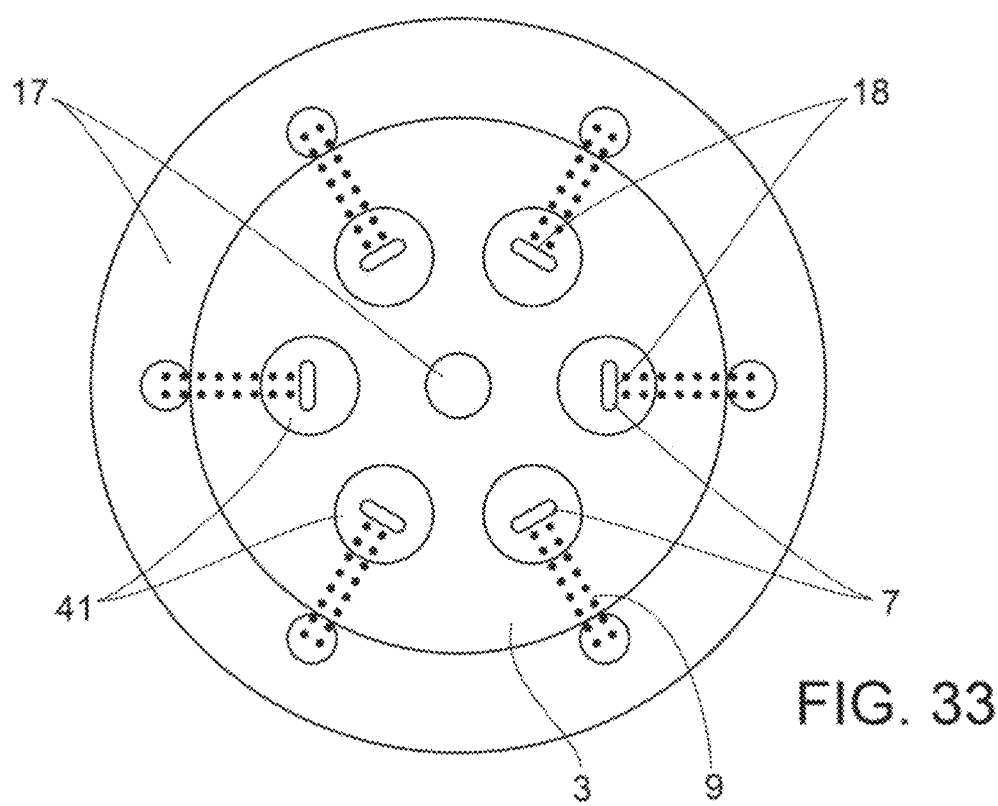
FIG. 33 is a top cross-sectional view of the production device, showing an example of the configuration of the working example 3 of the present invention that has a plurality of the catalyst raw material supplying nozzles, where the catalyst raw material supplying nozzles are integrally formed by boring a plurality of holes in a heat insulation material.
Figure 34:
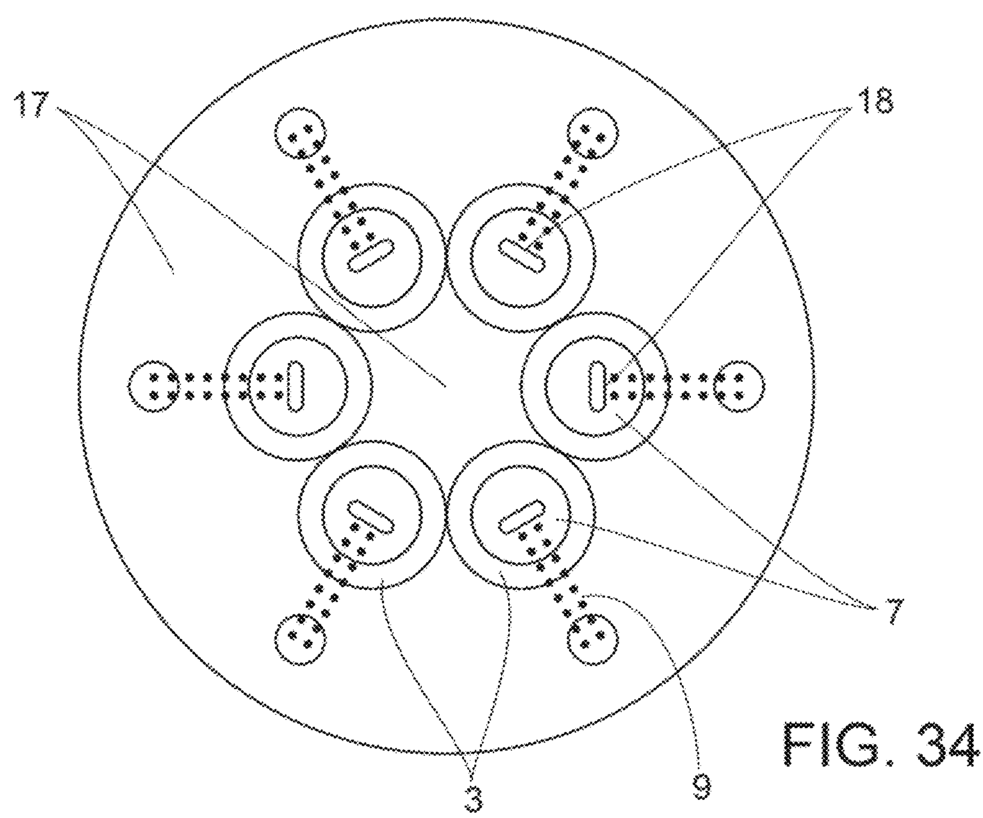
FIG. 34 is a top cross-sectional view of the production device, showing an example of the configuration of the working example 3 of the present invention that has a plurality of the catalyst raw material supplying nozzles, where the catalyst raw material supplying nozzles are separately formed using individual heat insulation materials.

FIG. 32 is a side cross-sectional view of a CNT production device 1 configured to have a plurality of the catalyst raw material supplying nozzles 3, as opposed to the CNT production device 1 of FIG. 31 that has only one catalyst raw material supplying nozzle 3. FIG. 33 is a top view corresponding to FIG. 32. Except for the configuration of employing a plurality of the catalyst raw material supplying nozzles 3, this production device 1 can be configured in a similar manner as FIG. 31. In FIG. 33, the plurality of the catalyst raw material supplying nozzles 3 are formed by boring in a cylindrical heat insulation material a plurality of holes 41 penetrating such heat insulation material from the upper surface thereof to the lower surface thereof. The heater 7 is provided in each of the plurality of holes 41, and the catalyst raw material supplying tube 14 is connected to the upper portion of each hole. As a method for forming a plurality of the catalyst raw material supplying nozzles 3, FIG. 34 shows an example different from FIG. 33. In FIG. 34, each of the plurality of the catalyst raw material supplying nozzles 3 is individually made of a cylindrical heat insulation material. The heater 7 is provided inside each cylindrical heat insulation material, and the catalyst raw material supplying tube 14 is connected to the upper portion of each heat insulation material.

As shown in the working examples 1 to 3, the carbon nanotube production method of the present invention can be performed using the production device(s) shown in FIGS. 1 to 3 and FIGS. 31 to 34, whereby carbon nanotubes can be produced at a high density, high purity, high quality and high yield.

The embodiment and working examples of the present invention have been described as above; the present invention may be variously modified before exploitation. For example, sizes such as the diameter and length of the catalyst raw material supplying nozzle 3, the width and length of the heater 7 provided inside the catalyst raw material supplying nozzle 3 and the width of the slit 18, are not limited to those shown in FIG. 31, but may be appropriately configured. There are also no particular restrictions on the shape of the heater 7; for example, even if it is to be formed into an inverted U shape, a production method thereof shall not be limited to the method described above. Other than electric heating, induction heating or the like may also be employed for heating the heater 7.

Further, the production device may also be a device where the carbon raw material is to be supplied to the synthesis furnace 2 at a low temperature without being preheated, and then rapidly heated at the synthesis furnace 2.

Furthermore, only the working example 3 is described as a specific configuration employing a plurality of the catalyst raw material supplying nozzles 3; as is the case with the working example 3, the working examples 1 and 2 may also have a configuration employing a plurality of the catalyst raw material supplying nozzles 3.

DESCRIPTION OF THE SYMBOLS

1 Carbon nanotube production device
2 Synthesis furnace
3 Catalyst raw material supplying nozzle
4 Inner portion
5 Reaction field
6 Nozzle temperature adjusting unit
7 Heater
8 Heat retention unit
9 Electrode
11 Catalyst raw material supplying portion
12 Carbon raw material supplying portion
13 Inert gas supplying portion
14 Catalyst raw material supplying tube
15 Carbon raw material supplying tube
17 Carbon raw material flow passage
18 Slit
19 Carbon raw material flow outlet
21 Coil
22 Heat transfer rod
23 Heat insulation material
31 Aggregate of CNTs
32 Single-walled carbon nanotubes (SWCNT)
41 Hole

The invention claimed is:

1. A carbon nanotube production device comprising:
a synthesis furnace for synthesizing carbon nanotubes;
a catalyst raw material supplying nozzle for supplying a catalyst raw material used to synthesize the carbon nanotubes to the synthesis furnace;
a heater provided inside the catalyst raw material supplying nozzle, said heater capable of setting a temperature of an inner portion of the catalyst raw material supplying nozzle higher than a temperature of a reaction field of the synthesis furnace to thermally decompose the catalyst raw material; and
a carbon raw material supplying portion for supplying a carbon raw material through a carbon raw material flow passage to the synthesis furnace,
wherein the decomposed catalyst raw material supplied from the catalyst raw material supplying nozzle and the carbon raw material provided through the carbon raw material flow passage are mixed together in the reaction field of the synthesis furnace.

2. The production device according to claim 1, wherein the temperature of the inner portion of the catalyst raw material supplying nozzle is a temperature at which the catalyst raw material thermally decomposes to generate a catalyst metal vapor; the temperature of the reaction field of the synthesis furnace is a temperature at which catalyst metal particles are generated, and CNTs are generated.

3. The carbon nanotube production device according to claim 1, wherein there are provided a plurality of the catalyst raw material supplying nozzles.

4. The carbon nanotube production device according to claim 2, wherein there are provided a plurality of the catalyst raw material supplying nozzles.

5. The carbon nanotube production device according to claim 1, wherein the carbon raw material flow passage is provided outside an outer circumferential portion of the catalyst raw material supplying nozzle.

6. The carbon nanotube production device according to claim 2, wherein the carbon raw material flow passage is provided outside an outer circumferential portion of the catalyst raw material supplying nozzle.

7. The carbon nanotube production device according to claim 3, wherein the carbon raw material flow passage is provided outside an outer circumferential portion of the catalyst raw material supplying nozzle.

8. The carbon nanotube production device according to claim 4, wherein the carbon raw material flow passage is provided outside an outer circumferential portion of the catalyst raw material supplying nozzle.

9. A carbon nanotube production method comprising:
setting a temperature of an inner portion of a catalyst raw material supplying nozzle higher than a temperature of a reaction field of a synthesis furnace;
heating the catalyst raw material at the inner portion of the catalyst raw material supplying nozzle by a heater to thermally decompose the catalyst raw material;
supplying the thermally decomposed catalyst raw material to the synthesis furnace;
supplying a carbon raw material to the synthesis furnace;

mixing the decomposed catalyst raw material and the carbon raw material in the reaction field of the synthesis furnace to synthesize carbon nanotubes.

10. The production method according to claim 9, wherein the temperature of the inner portion of the catalyst raw material supplying nozzle is a temperature at which the catalyst raw material thermally decomposes to generate a catalyst metal vapor; the temperature of the reaction field of the synthesis furnace is a temperature at which CNTs are generated.

11. A carbon nanotube production device comprising:

a synthesis furnace for synthesizing carbon nanotubes;

a catalyst raw material supplying nozzle for supplying a catalyst raw material used to synthesize the carbon nanotubes to the synthesis furnace; and a nozzle temperature adjusting unit capable of setting a temperature of an inner portion of the catalyst raw material supplying nozzle higher than a temperature of a reaction field of the synthesis furnace, wherein as the nozzle temperature adjusting unit, a unit for performing heating from outside the catalyst raw material supplying nozzle and a unit for performing heating from within the catalyst raw material supplying nozzle are used in combination, and wherein as the unit for performing heating from within the catalyst raw material supplying nozzle, a ceramic heat transfer rod is installed inside the catalyst raw material supplying nozzle.

12. The production device according to claim 11, wherein the temperature of the inner portion of the catalyst raw material supplying nozzle is a temperature at which the catalyst raw material thermally decomposes to generate a catalyst metal vapor; the temperature of the reaction field of the synthesis furnace is a temperature at which catalyst metal particles are generated, and CNTs are generated.

13. The carbon nanotube production device according to claim 11, wherein there are provided a plurality of the catalyst raw material supplying nozzles.

14. The carbon nanotube production device according to claim 12, wherein there are provided a plurality of the catalyst raw material supplying nozzles.

15. The carbon nanotube production device according to claim 11, wherein a carbon raw material flow passage for flowing a carbon raw material therethrough is provided outside an outer circumferential portion of the catalyst raw material supplying nozzle.

16. The carbon nanotube production device according to claim 12, wherein a carbon raw material flow passage for flowing a carbon raw material therethrough is provided outside an outer circumferential portion of the catalyst raw material supplying nozzle.

17. The carbon nanotube production device according to claim 13, wherein a carbon raw material flow passage for flowing a carbon raw material therethrough is provided outside an outer circumferential portion of the catalyst raw material supplying nozzle.

18. The carbon nanotube production device according to claim 14, wherein a carbon raw material flow passage for flowing a carbon raw material therethrough is provided outside an outer circumferential portion of the catalyst raw material supplying nozzle.

19. A carbon nanotube production method comprising:

setting a temperature of an inner portion of a catalyst raw material supplying nozzle higher than a temperature of a reaction field of a synthesis furnace for synthesizing the carbon nanotubes;

heating the catalyst raw material at the inner portion of the catalyst raw material supplying nozzle; and supplying the catalyst raw material to be used to synthesize carbon nanotubes to the synthesis furnace, wherein by a nozzle temperature adjusting unit, it is possible to set the temperature of the inner portion of the catalyst raw material supplying nozzle higher than the temperature of the reaction field of the synthesis furnace, wherein as the nozzle temperature adjusting unit, a unit for performing heating from outside the catalyst raw material supplying nozzle and a unit for performing heating from within the catalyst raw material supplying nozzle are used in combination, and wherein as the unit for performing heating from within the catalyst raw material supplying nozzle, a ceramic heat transfer rod is installed inside the catalyst raw material supplying nozzle.

20. The production method according to claim 19, wherein the temperature of the inner portion of the catalyst raw material supplying nozzle is a temperature at which the catalyst raw material thermally decomposes to generate a catalyst metal vapor; the temperature of the reaction field of the synthesis furnace is a temperature at which CNTs are generated.

* * * * *